US012333662B2

United States Patent
Burns et al.

(10) Patent No.: US 12,333,662 B2
(45) Date of Patent: Jun. 17, 2025

(54) PRESENTATIONS IN MULTI-USER COMMUNICATION SESSIONS

(71) Applicant: Apple Inc., Cupertino, CA (US)

(72) Inventors: Aaron M Burns, Sunnyvale, CA (US);
Adam G Poulos, Saratoga, CA (US);
Alexis H Palangie, Palo Alto, CA (US);
Benjamin R Blachnitzky, San Francisco, CA (US); Charilaos Papadopoulos, Redwood City, CA (US); David M Schattel, Santa Clara, CA (US); Ezgi Demirayak, Sunnyvale, CA (US); Jia Wang, Redmond, WA (US); Reza Abbasian, Los Gatos, CA (US); Ryan S Carlin, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/345,884

(22) Filed: Jun. 30, 2023

(65) Prior Publication Data
US 2024/0056492 A1 Feb. 15, 2024

Related U.S. Application Data

(60) Provisional application No. 63/397,508, filed on Aug. 12, 2022, provisional application No. 63/397,276, (Continued)

(51) Int. Cl.
*H04L 65/403* (2022.01)
*G06F 3/01* (2006.01)
(Continued)

(52) U.S. Cl.
CPC ............ *G06T 19/006* (2013.01); *G06F 3/017* (2013.01); *G06T 13/40* (2013.01); *G06T 19/003* (2013.01);
(Continued)

(58) Field of Classification Search
CPC ... H04L 65/403; H04L 65/613; H04L 65/752; H04L 65/104; G06F 13/40; G06F 19/103; G06F 19/005
(Continued)

(56) References Cited

U.S. PATENT DOCUMENTS 9,452,354 B2    9/2016  Rimon
9,473,758 B1    10/2016 Long et al.
(Continued)

FOREIGN PATENT DOCUMENTS

CN    114222960 A  *  3/2022  ............ G06F 1/3212
EP     3896556 A1  * 10/2021  ............ G02B 27/017
(Continued)

OTHER PUBLICATIONS

Chen Yao Wang et al., "VR-Replay: Capturing and Replaying Avatars in VR for Asynchronous 3D Collaborative Design", 2019 IEEE Conference on Virtual Reality and 3D User Interfaces, Mar. 23-27, 2019, pp. 1215-1216, IEEE, Osaka, JP.
(Continued)

*Primary Examiner* — Khanh Q Dinh
(74) *Attorney, Agent, or Firm* — Treyz Law Group, P.C.; Joseph F. Guihan

(57) ABSTRACT

An electronic device such as a head-mounted device may present extended reality content such as a representation of a three-dimensional environment. The representation of the three-dimensional environment may be changed between different viewing modes having different immersion levels in response to user input. The three-dimensional environment may represent a multiuser communication session. A multiuser communication session may be saved and subsequently viewed as a replay. There may be an interactive virtual object within the replay of the multiuser communication session. The pose of the interactive virtual object may
(Continued)

be manipulated by a user while the replay is paused. Some multiuser communication sessions may be hierarchical multiuser communication sessions with a presenter and audience members. The presenter and audience members may receive generalized feedback based on the audience members during the presentation. A participant may have their role changed between audience member and presenter during the presentation.

21 Claims, 23 Drawing Sheets

Related U.S. Application Data filed on Aug. 11, 2022, provisional application No. 63/397,270, filed on Aug. 11, 2022.

(51) Int. Cl.

| | | |
|---|---|---|
| G06T 13/40 | (2011.01) | |
| G06T 19/00 | (2011.01) | |
| G06T 19/20 | (2011.01) | |
| H04N 7/15 | (2006.01) | |
| H04N 21/431 | (2011.01) | |
| H04N 21/81 | (2011.01) | |

(52) U.S. Cl.
CPC ............ *G06T 19/20* (2013.01); *H04L 65/403* (2013.01); *H04N 7/157* (2013.01); *H04N 21/4316* (2013.01); *H04N 21/816* (2013.01); *G06T 2219/024* (2013.01); *G06T 2219/2016* (2013.01)

(58) Field of Classification Search
USPC .......................... 709/220, 224, 225, 227, 228
See application file for complete search history.

(56) References Cited

U.S. PATENT DOCUMENTS

| | | | |
|---|---|---|---|
| 9,573,062 B1 | 2/2017 | Long et al. | |
| 9,616,338 B1 | 4/2017 | Hooper et al. | |
| 9,749,367 B1 | 8/2017 | Kirby et al. | |
| 9,865,089 B2 | 1/2018 | Burns et al. | |
| 9,886,682 B2 | 2/2018 | Marin | |
| 10,463,962 B2 | 11/2019 | Marks et al. | |
| 10,474,336 B2 | 11/2019 | Smith | |
| 10,924,709 B1* | 2/2021 | Faulkner | H04N 7/15 |
| 11,039,974 B2* | 6/2021 | Kodama | A61H 1/0277 |
| 11,163,588 B2 | 11/2021 | Rubenfield et al. | |
| 11,169,824 B2 | 11/2021 | Rubenfield et al. | |
| 11,222,298 B2 | 1/2022 | Abelow | |
| 11,394,925 B1* | 7/2022 | Faulkner | G06F 3/013 |
| 11,402,871 B1* | 8/2022 | Berliner | G06T 7/70 |
| 11,434,665 B2* | 9/2022 | Andersen | E05B 65/46 |
| 11,507,342 B1* | 11/2022 | Agrawal | G06V 40/20 |
| 2016/0011729 A1* | 1/2016 | Flores | G06Q 30/0201 715/728 |
| 2017/0199639 A1* | 7/2017 | O'Hara | G06F 3/0484 |
| 2017/0256096 A1 | 9/2017 | Faaborg et al. | |
| 2018/0356878 A1 | 12/2018 | Dudekula et al. | |
| 2019/0139318 A1 | 5/2019 | Tierney et al. | |
| 2019/0230644 A1* | 7/2019 | Cheng | H04W 72/0446 |
| 2020/0225844 A1 | 7/2020 | Lerner et al. | |
| 2020/0336518 A1 | 10/2020 | Huynh et al. | |
| 2020/0351384 A1* | 11/2020 | Ruistola | H04L 67/14 |
| 2020/0356136 A1* | 11/2020 | Aimone | A61B 5/6831 |
| 2021/0012676 A1* | 1/2021 | Jackson | G09B 5/065 |
| 2021/0076002 A1* | 3/2021 | Peters | H04N 7/152 |
| 2021/0311608 A1 | 10/2021 | Sommer et al. | |
| 2021/0346811 A1 | 11/2021 | Khan et al. | |
| 2022/0056492 A1* | 2/2022 | Chu | C12P 7/625 |
| 2022/0084289 A1* | 3/2022 | Casaburo | G06T 19/006 |
| 2022/0094724 A1* | 3/2022 | Stahl | H04L 63/102 |
| 2022/0103566 A1* | 3/2022 | Faulkner | H04L 67/06 |
| 2022/0150083 A1* | 5/2022 | Faulkner | H04L 65/1093 |
| 2022/0244903 A1* | 8/2022 | Taylor | G06F 3/1454 |
| 2022/0254120 A1* | 8/2022 | Berliner | G02B 27/017 |
| 2022/0262080 A1* | 8/2022 | Burton | G06V 40/168 |
| 2022/0374136 A1* | 11/2022 | Chang | G06F 3/04845 |
| 2023/0208663 A1* | 6/2023 | Jovanovic | H04N 7/147 709/204 |
| 2023/0379649 A1* | 11/2023 | Gonzalez Delgado | G06F 3/011 |

FOREIGN PATENT DOCUMENTS

| | | |
|---|---|---|
| WO | 2021257282 A1 | 12/2021 |
| WO | 2022192306 A1 | 9/2022 |

OTHER PUBLICATIONS

Johanna Roettl et al., "The same video game in 2D, 3D or virtual reality—How does technology impact game evaluation and brand placements?", PLOS ONE, Jul. 20, 2018, pp. 1-24, vol. 13, No. 7, PLOS, San Francisco, CA.

U.S. Appl. No. 63/184,483, filed May 5, 2021.

Meta, "Introducing Horizon Workrooms: Remote Collaboration Reimagined", Meta Quest, Aug. 19, 2021, Meta, Menlo Park, CA, https://about.fb.com/news/2021/08/introducing-horizon-workrooms-remote-collaboration-reimagined/.

Meta, "Opening Horizon Worlds to Everyone 18+ in the US and Canada", Meta Quest, Dec. 9, 2021, Meta, Menlo Park, CA, https://about.fb.com/news/2021/12/horizon-worlds-open-in-us-and-canada/.

Meta, "Introducing 'ShapesXR,' a New Tool for Real-Time Collaboration and Prototyping in VR", Meta Quest Blog, Nov. 11, 2021, Meta, Menlo Park, CA, https://www.meta.com/blog/quest/introducing-shapesxr-a-new-tool-for-real-time-collaboration-and-prototyping-in-vr/.

Sam Sprigg, "Spatial to focus on becoming a metaverse platform for cultural events and announces $25M in new funding", Dec. 14, 2021, Auganix, Vancouver, CA, https://www.auganix.org/spatial-to-focus-on-becoming-a-metaverse-platform-for-cultural-events-and-announces-25m-in-new-funding/.

Adi Robertson, "Here's what it's like to attend a press conference in virtual reality", Sep. 15, 2015, The Verge, Washington, DC, https://www.theverge.com/2015/9/15/9326357/altspacevr-product-gearvr-support-virtual-reality.

PRNewswire, "Social Gaming Platform Rec Room Announces New Funding at $1.25 Billion Valuation", Mar. 24, 2021, Cision, Chicago, IL, https://www.prnewswire.com/news-releases/social-gaming-platform-rec-room-announces-new-funding-at-1-25-billion-valuation-301254699.html.

Bobby Carlton, "Bigscreen VR Launches On-Demand Content In Response To Increased Traffic", Apr. 25, 2020, VR Scout, Los Angeles, CA, https://vrscout.com/news/bigscreen-increased-traffic-on-demand/.

"Virbela" Jan. 12, 2021, Virtual Events Group, New York, NY, https://virtualeventsgroup.org/project/virbela/.

John Roach, "Mesh for Microsoft Teams aims to make collaboration in the 'metaverse' personal and fun", Nov. 2, 2021, Microsoft, Redmond, WA, https://news.microsoft.com/source/features/innovation/mesh-for-microsoft-teams/.

\* cited by examiner

PRESENTATIONS IN MULTI-USER COMMUNICATION SESSIONS

This application claims priority to U.S. provisional patent application No. 63/397,270, filed Aug. 11, 2022, U.S. provisional patent application No. 63/397,276, filed Aug. 11, 2022, and U.S. provisional patent application No. 63/397,508, filed Aug. 12, 2022, which are hereby incorporated by reference herein in their entireties.

BACKGROUND

This relates generally to electronic devices, and, more particularly, to electronic devices with displays.

Some electronic devices such as head-mounted devices include displays that are positioned close to a user's eyes during operation (sometimes referred to as near-eye displays). The displays may be used to display virtual content.

SUMMARY

An electronic device may include one or more sensors, one or more displays, one or more processors, and memory storing instructions configured to be executed by the one or more processors. The instructions may include instructions for obtaining content comprising a representation of a three-dimensional environment, presenting, using at least the one or more displays, the content in an extended reality environment in a first viewing mode, wherein in the first viewing mode the content is presented based on a viewpoint positioned within the representation of the three-dimensional environment, obtaining, via the one or more sensors, user input, and in response to the user input, presenting, using at least the one or more displays, the content in the extended reality environment in a second viewing mode, wherein in the second viewing mode the content is presented based on a viewpoint that is external to the representation of the three-dimensional environment.

An electronic device may include one or more sensors, one or more displays, one or more processors, and memory storing instructions configured to be executed by the one or more processors. The instructions may include instructions for presenting, using at least the one or more displays, a replay of an extended reality session that includes an interactive virtual object, obtaining a first user input via the one or more sensors, pausing the replay of the extended reality session in response to the first user input, obtaining a second user input via the one or more sensors, and in response to the second user input and while the replay of the extended reality session is paused, modifying a pose of the interactive virtual object within the replay of the extended reality session.

An electronic device may include one or more sensors, one or more displays, one or more processors, and memory storing instructions configured to be executed by the one or more processors. The instructions may include instructions for, while in a presenter role for a multiuser communication session, presenting, using at least the one or more displays, an extended reality environment. The extended reality environment may include a representation of a virtual audience from a perspective on a virtual stage and the representation may include generalized feedback based on participants of the multiuser communication session having an audience member role.

An electronic device may include one or more sensors, one or more displays, one or more processors, and memory storing instructions configured to be executed by the one or more processors. The instructions may include instructions for, while in an audience member role for a multiuser communication session, presenting, using at least the one or more displays, an extended reality environment. The extended reality environment may include a representation of a virtual stage from a perspective in a virtual audience, the virtual audience comprising one or more avatars for one or more participants of the multiuser communication session having the audience member role, wherein a user of the electronic device is permitted to directly communicate with the one or more participants, and generalized feedback based on other participants of the multiuser communication session having the audience member role.

An electronic device may include one or more sensors, one or more displays, one or more processors, and memory storing instructions configured to be executed by the one or more processors. The instructions may include instructions for, while in an audience member role for a multiuser communication session, presenting, using at least the one or more displays, a first extended reality environment and in response to a change from the audience member role to a presenter role for the multiuser communication session, presenting, using at least the one or more displays, a second extended reality environment. The first extended reality environment may include a representation of a virtual stage from a perspective in a virtual audience, the virtual audience representative of participants of the multiuser communication session having the audience member role. A user of the electronic device, while in the audience member role, may be prevented from directly communicating with a participant of the multiuser communication session having a presenter role. The second extended reality environment may include a representation of the virtual audience from a perspective on the virtual stage. The user of the electronic device, while in the presenter role, may be permitted to directly communicate with the participant of the multiuser communication session having the presenter role.

DETAILED DESCRIPTION

Figure 1:
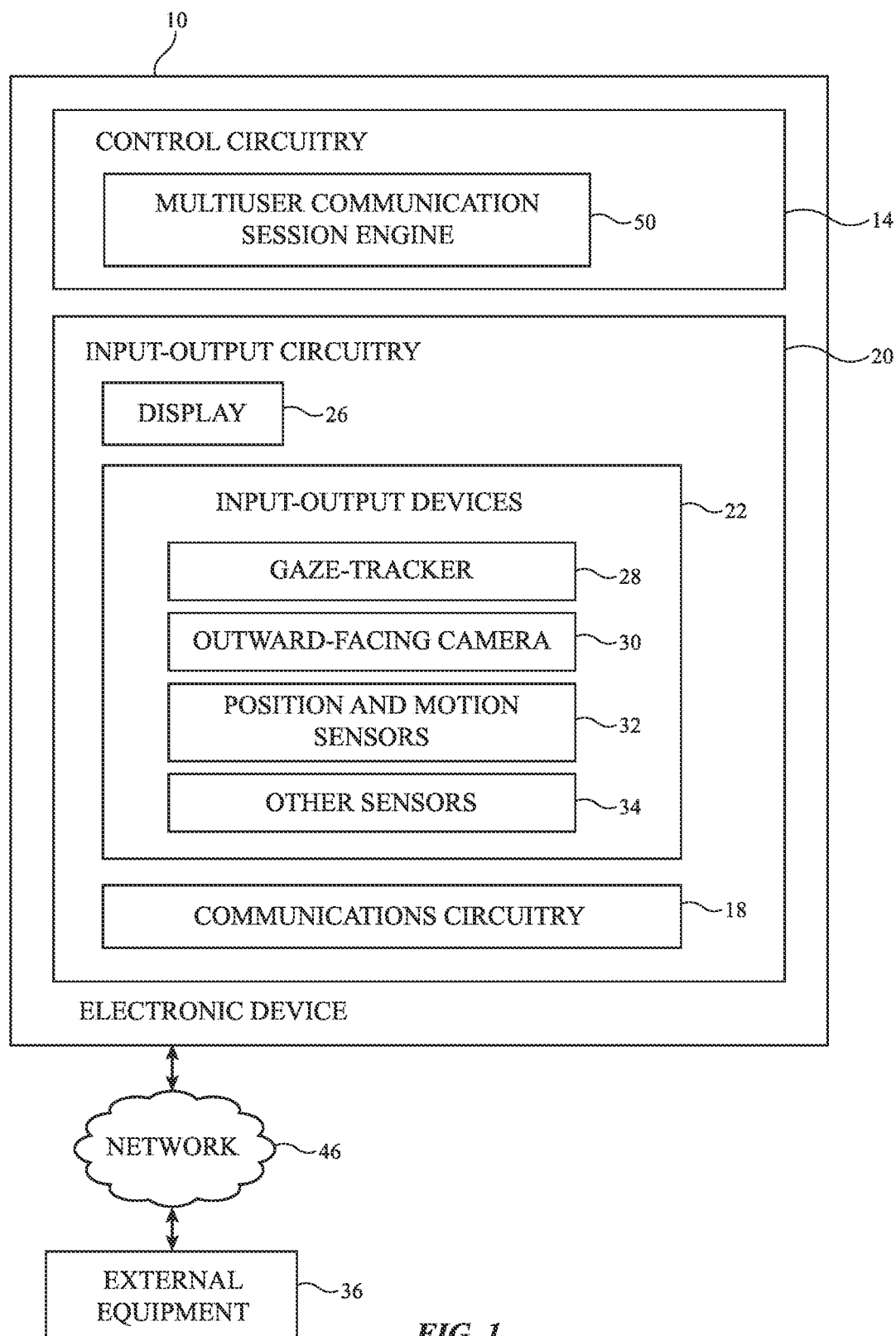
FIG. 1 is a schematic diagram of an illustrative electronic device in accordance with some embodiments.

Head-mounted devices may display different types of extended reality content for a user. The head-mounted device may display a virtual object that is perceived at an apparent depth within the physical environment of the user. Virtual objects may sometimes be displayed at fixed locations relative to the physical environment of the user. For example, consider an example where a user's physical environment includes a table. A virtual object may be displayed for the user such that the virtual object appears to be resting on the table. As the user moves their head and otherwise interacts with the XR environment, the virtual object remains at the same, fixed position on the table (e.g., as if the virtual object were another physical object in the XR environment). This type of content may be referred to as world-locked content (because the position of the virtual object is fixed relative to the physical environment of the user).

Other virtual objects may be displayed at locations that are defined relative to the head-mounted device or a user of the head-mounted device. First, consider the example of virtual objects that are displayed at locations that are defined relative to the head-mounted device. As the head-mounted device moves (e.g., with the rotation of the user's head), the virtual object remains in a fixed position relative to the head-mounted device. For example, the virtual object may be displayed in the front and center of the head-mounted device (e.g., in the center of the device's or user's field-of-view) at a particular distance. As the user moves their head left and right, their view of their physical environment changes accordingly. However, the virtual object may remain fixed in the center of the device's or user's field of view at the particular distance as the user moves their head (assuming gaze direction remains constant). This type of content may be referred to as head-locked content. The head-locked content is fixed in a given position relative to the head-mounted device (and therefore the user's head which is supporting the head-mounted device). The head-locked content may not be adjusted based on a user's gaze direction. In other words, if the user's head position remains constant and their gaze is directed away from the head-locked content, the head-locked content will remain in the same apparent position.

Second, consider the example of virtual objects that are displayed at locations that are defined relative to a portion of the user of the head-mounted device (e.g., relative to the user's torso). This type of content may be referred to as body-locked content. For example, a virtual object may be displayed in front and to the left of a user's body (e.g., at a location defined by a distance and an angular offset from a forward-facing direction of the user's torso), regardless of which direction the user's head is facing. If the user's body is facing a first direction, the virtual object will be displayed in front and to the left of the user's body. While facing the first direction, the virtual object may remain at the same, fixed position relative to the user's body in the XR environment despite the user rotating their head left and right (to look towards and away from the virtual object). However, the virtual object may move within the device's or user's field of view in response to the user rotating their head. If the user turns around and their body faces a second direction that is the opposite of the first direction, the virtual object will be repositioned within the XR environment such that it is still displayed in front and to the left of the user's body. While facing the second direction, the virtual object may remain at the same, fixed position relative to the user's body in the XR environment despite the user rotating their head left and right (to look towards and away from the virtual object).

In the aforementioned example, body-locked content is displayed at a fixed position/orientation relative to the user's body even as the user's body rotates. For example, the virtual object may be displayed at a fixed distance in front of the user's body. If the user is facing north, the virtual object is in front of the user's body (to the north) by the fixed distance. If the user rotates and is facing south, the virtual object is in front of the user's body (to the south) by the fixed distance.

Alternatively, the distance offset between the body-locked content and the user may be fixed relative to the user whereas the orientation of the body-locked content may remain fixed relative to the physical environment. For example, the virtual object may be displayed in front of the user's body at a fixed distance from the user as the user faces north. If the user rotates and is facing south, the virtual object remains to the north of the user's body at the fixed distance from the user's body.

Body-locked content may also be configured to always remain gravity or horizon aligned, such that head and/or body changes in the roll orientation would not cause the body-locked content to move within the XR environment. Translational movement may cause the body-locked content to be repositioned within the XR environment to maintain the fixed distance from the user. Subsequent descriptions of body-locked content may include both of the aforementioned types of body-locked content.

A schematic diagram of an illustrative electronic device is shown in FIG. 1. As shown in FIG. 1, electronic device 10 (sometimes referred to as head-mounted device 10, head-mounted display 10, system 10, etc.) may have control circuitry 14. Control circuitry 14 may be configured to perform operations in electronic device 10 using hardware (e.g., dedicated hardware or circuitry), firmware and/or software. Software code for performing operations in electronic device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Electronic device 10 may include input-output circuitry 20. Input-output circuitry 20 may be used to allow data to be received by electronic device 10 from external equipment (e.g., a tethered computer, a portable device such as a handheld device or laptop computer, or other electrical equipment) and to allow a user to provide electronic device 10 with user input. Input-output circuitry 20 may also be used to gather information on the environment in which electronic device 10 is operating. Output components in circuitry 20 may allow electronic device 10 to provide a user with output and may be used to communicate with external electrical equipment.

As shown in FIG. 1, input-output circuitry 20 may include a display such as display 26. Display 26 may be used to display images for a user of electronic device 10. Display 26 may be a transparent or translucent display so that a user may observe physical objects through the display while computer-generated content is overlaid on top of the physical objects by presenting computer-generated images on the display. A transparent or translucent display may be formed from a transparent or translucent pixel array (e.g., a transparent organic light-emitting diode display panel) or may be formed by a display device that provides images to a user through a beam splitter, holographic coupler, or other optical coupler (e.g., a display device such as a liquid crystal on silicon display). Alternatively, display 26 may be an opaque display that blocks light from real-world objects when a user operates electronic device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 26 is opaque, the display may also optionally display entirely computer-generated content (e.g., without displaying real-world images).

Display 26 may include one or more optical systems (e.g., lenses) that allow a viewer to view images on display(s) 26. A single display 26 may produce images for both eyes or a pair of displays 26 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Input-output circuitry 20 may include components such as input-output devices 22 for gathering data and user input and for supplying a user with output. Devices 22 may include a gaze-tracker such as gaze-tracker 28 (sometimes referred to as a gaze-tracking system or a gaze-tracking camera) and a camera such as camera 30.

Gaze-tracker 28 may include a camera and/or other gaze-tracking system components (e.g., light sources that emit beams of light so that reflections of the beams from a user's eyes may be detected) to monitor the user's eyes. Gaze-tracker(s) 28 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 28 is merely illustrative.

Cameras such as outward-facing camera(s) 30 (sometimes referred to as outward-facing camera module 30 or camera module 30) may be used to capture images of the physical environment surrounding the user. For example, one or more outward-facing cameras 30 may be used to capture images of physical objects in front of a user and on the left and right sides of a user's field of view. The images of physical world objects that are gathered in this way may be presented for the user on display 26 and/or may be processed by control circuitry 14 to determine the locations of electronic devices (e.g., displays, etc.), people, buildings, and other physical objects relative to the user. The physical environment may also be analyzed using image processing algorithms. Information from camera 30 may be used in controlling display 26.

Outward-facing camera 30 may serve as a pass-through camera that obtains images of the physical environment of the user. The physical environment images corresponding to the user's field of view (as determined by the gaze-tracker and the position of the head-mounted device) are then displayed on display 26. In this way, the user perceives that they are viewing the physical environment (by replicating physical environment viewing with the pass-through camera and display).

In addition to adjusting components such as display 26 based on information from gaze-tracker 28 and/or outward-facing cameras 30, control circuitry 14 may gather sensor data and user input from other input-output circuitry 20 to use in controlling electronic device 10. As shown in FIG. 1, input-output devices 22 may include position and motion sensors 32 (e.g., compasses, gyroscopes, accelerometers, and/or other devices for monitoring the location, orientation, and movement of electronic device 10, satellite navigation system circuitry such as Global Positioning System circuitry for monitoring user location, etc.). Using sensors 32, for example, control circuitry 14 can monitor the current direction in which a user's head is oriented relative to the surrounding environment. Movements of the user's head (e.g., the user's head pose) may also be monitored using sensors 32. In one example, position and motion sensors 32 may include one or more outward-facing cameras 30. The outward-facing cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output devices 22 may also include other sensors and input-output components 34 (e.g., ambient light sensors, force sensors, temperature sensors, touch sensors, buttons, capacitive proximity sensors, light-based proximity sensors, other proximity sensors, strain gauges, gas sensors, pressure sensors, moisture sensors, magnetic sensors, microphones, speakers, audio components, haptic output devices, light-emitting diodes, other light sources, etc.).

Circuitry 20 may include wired and wireless communications circuitry 18 that allows electronic device 10 (e.g., control circuitry 14) to communicate with external equipment 36 through network(s) 46. Examples of communication network(s) 46 include local area networks (LAN) and wide area networks (WAN) (e.g., the Internet). Communication network(s) 46 may be implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

External equipment 36 may include devices in the same physical environment as electronic device 10. For example, external equipment 36 may include remote controls, joysticks and other input controllers that are used to provide user input to electronic device 10. As additional examples, external equipment may include other electronic devices (e.g., cellular telephones, laptop computers, etc.) that are paired with electronic device 10 and optionally provide display content to electronic device 10. External equipment in the same physical environment as electronic device 10 may optionally have a wired connection to electronic device 10 (e.g., may be tethered) instead of a wireless connection.

External equipment 36 may also include devices that are not in the same physical environment as electronic device 10. For example, external equipment 36 may include one or more additional head-mounted devices (e.g., with which electronic device 10 engages a multiuser communication session). As another example, external equipment 36 may include an external server that provides information in response to requests from electronic device 10.

Electronic device 10 may include any other desired components. For example, the head-mounted device may include a battery.

Figure 2:
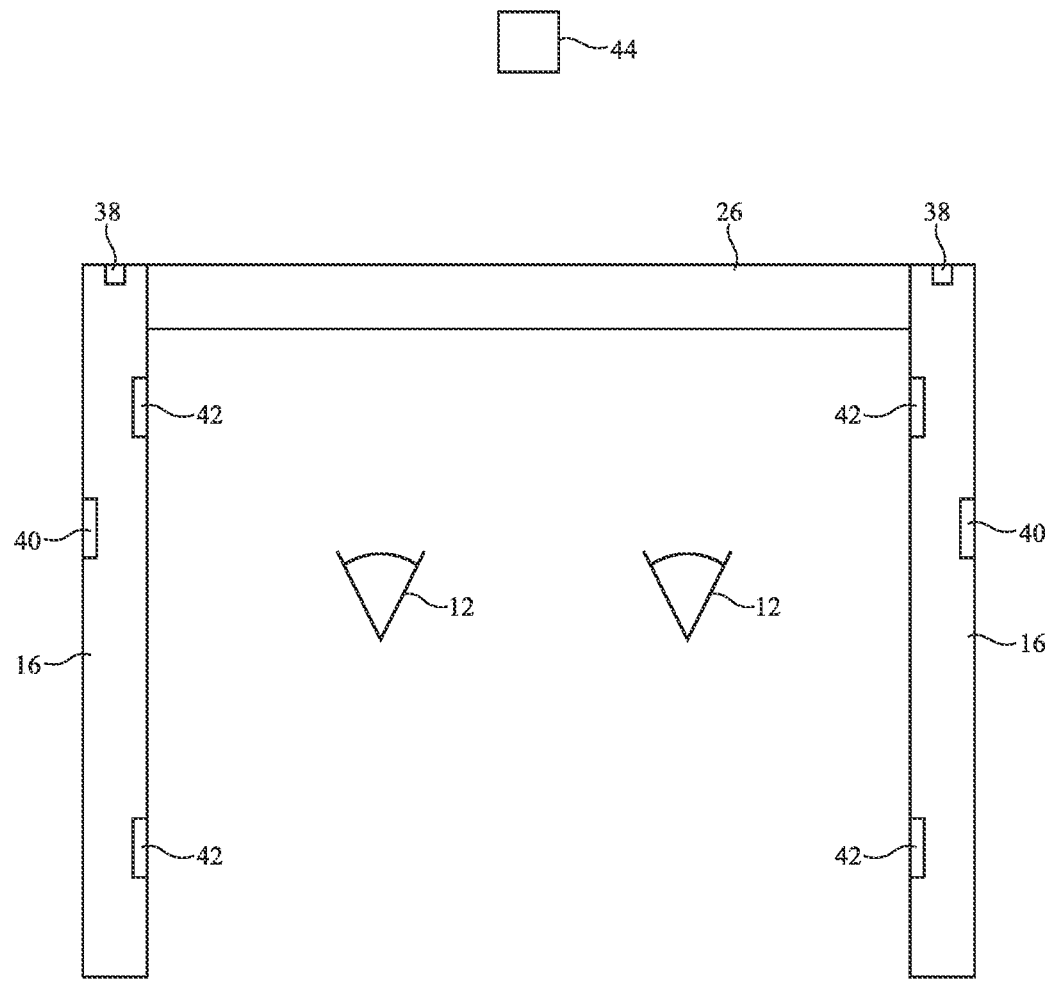
FIG. 2 is a top view of an illustrative electronic device in accordance with some embodiments.

The components of electronic device 10 may be supported by a head-mountable support structure such as illustrative support structure 16 of FIG. 2. Support structure 16 may have the shape of a frame of a pair of glasses (e.g., left and right temples and other frame members), may have a helmet shape, may have a goggles shape, or may have another head-mountable configuration. When worn on the head of a user, the user may view physical objects such as physical object 44 through display 26 in configurations where display 26 is a transparent display. In configurations where display 26 is opaque, the user's eyes 12 may be blocked from viewing physical object 44. Display 26 is supported by support structure 16 and is placed in front of user eyes 12 when worn on the head of the user.

Support structure 16 may support additional components at additional locations such as locations 38, 40, and 42. For example, components may be mounted on the front of support structure 16 in location 38. Outward-facing cameras 30 and/or sensors and other components in input-output circuitry 20 may be mounted in location 38. The components in location 38 may be used to detect the positions of physical objects (e.g., physical object 44) and/or for capturing images of the physical environment. Object 44 may include natural and manmade objects, people, buildings, sources of glare such as reflective objects, the sun, lights, etc.

Input-output devices 22 such as position and motion sensors 32, light detectors, or other desired input-output devices may be mounted in location 40. Components in location 40 may face the environment of the user (e.g., outward facing components facing away from the user). In contrast, components in location 42 may face the user (e.g., inward facing components facing the user). Input-output devices 22 such as gaze-tracker 28 (image sensors), speakers (e.g., ear speakers) or other audio components that play audio (e.g., audio associated with computer-generated images and/or other content that is being displayed using display 26, etc.) or other desired input-output devices may be mounted in locations 42.

The example in FIGS. 1 and 2 of electronic device 10 being a head-mounted device is merely illustrative. In some cases, electronic device 10 may be another type of electronic device (e.g., a tablet computer, laptop computer, a desktop computer, a television, a cellular telephone, a media player, a wristwatch device, or other wearable electronic equipment, etc.).

Multiple electronic devices 10 may communicate in a multiuser communication session. Herein, a multiuser communication session refers to a communication session in which two or more devices are participating in an XR environment. As shown in FIG. 1, control circuitry 14 in electronic device 10 may include a multiuser communication session engine 50. The multiuser communication session engine 50 for device 10 is configured to control the XR content presented using device 10 (e.g., using display 26 and other output devices in input-output circuitry 20) during the multiuser communication session.

Figure 3:
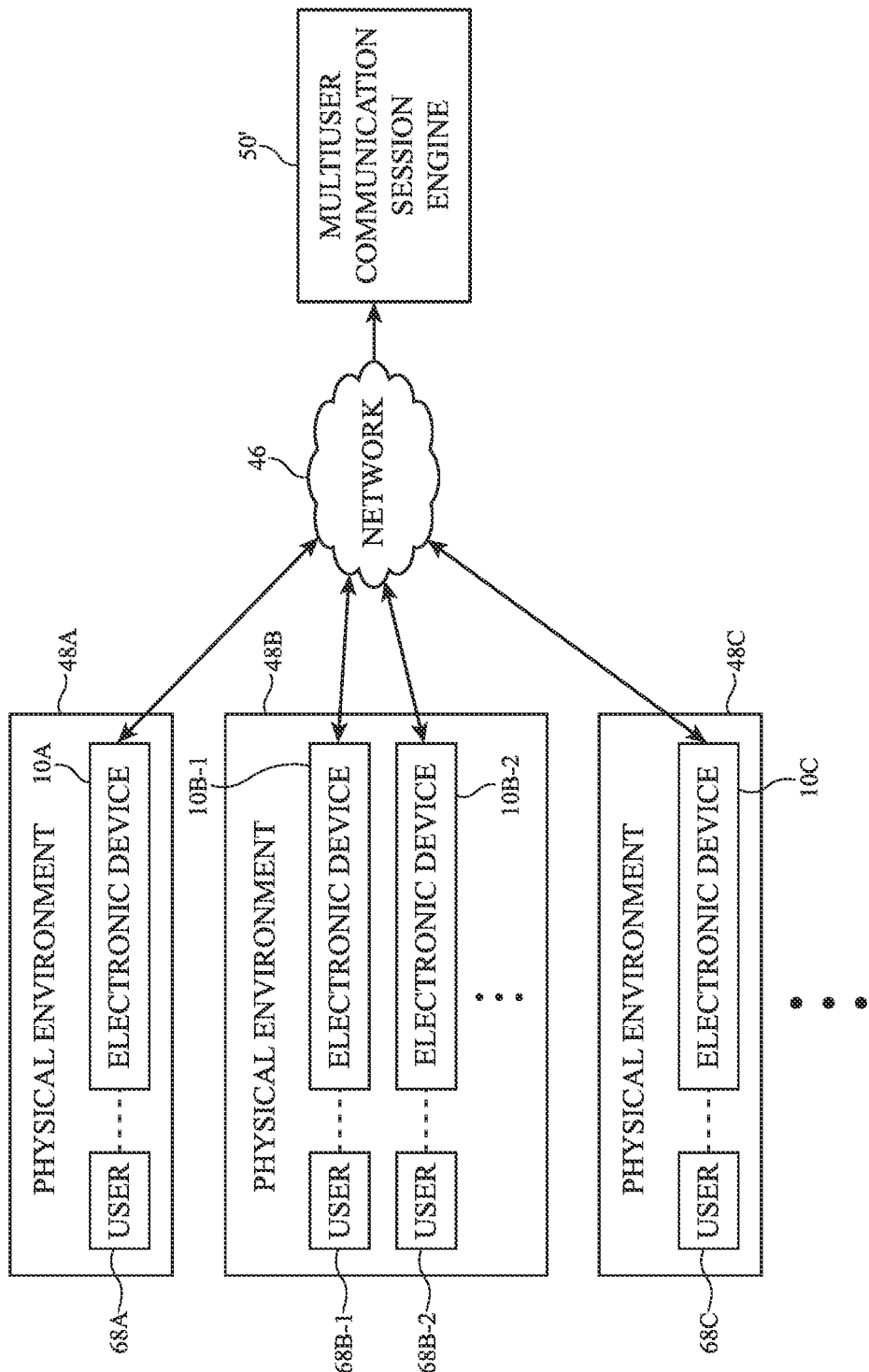
FIG. 3 is a schematic diagram of an illustrative multiuser communication session in accordance with some embodiments.

A schematic diagram of an illustrative multiuser communication session is shown in FIG. 3. As shown in FIG. 3, multiple electronic devices 10 are connected via network 46 during the multiuser communication session. Some of the electronic devices (and corresponding users) may be located in different physical environments. As shown in FIG. 3, a user 68A with electronic device 10A is present in physical environment 48A, users 68B-1 and 68B-2 with electronic devices 10B-1 and 10B-2, respectively, are present in physical environment 48B that is different than physical environment 48A, and user 68C with electronic device 10C is present in physical environment 48C that is different than physical environments 48A and 48B. Some electronic devices in the multiuser communication session may be located in the same physical environment. Electronic devices 10B-1 and 10B-2 are both located in physical environment 48B.

The type of metric (and magnitude of the metric) used to define which devices are in the same physical environment may be adjustable. For example, distance may be used to define which devices are in the same physical environment (e.g., devices within 10 feet of one another, within 20 feet of one another, within 50 feet of one another, etc. may be considered colocated in the same physical environment). As another example, devices that are determined to be within the same room may be considered colocated in the same physical environment. Correspondingly, devices in different physical environments may be located in different rooms in a common building or separated by larger distances (e.g., may be located in different cities, states, countries, etc.).

Herein, a local multiuser communication device may refer to a current device being described, or being controlled by a user being described, in a multiuser communication session. Colocated multiuser communication devices refer to two devices that share a physical environment and an XR environment (e.g., devices 10B-1 and 10B-2 in FIG. 3), such that the users of the colocated devices may experience the same physical objects and XR objects. A remote multiuser communication device may refer to a secondary device that is located in a separate physical environment from a current, local multiuser communication device. In one or more embodiments, the remote multiuser communication device may be a participant in the multiuser communication session. Shared virtual elements may refer to XR objects, such as virtual objects, that are visible or otherwise able to be experienced by participants in a common XR session.

Any desired number of electronic devices may participate in the multiuser communication session of FIG. 3. The multiuser communication session may include more than two electronic devices, more than five electronic devices, more than ten electronic devices, more than twenty electronic devices, more than fifty electronic devices, more than one hundred electronic devices, more than one thousand electronic devices, more than ten thousand electronic devices, more than one hundred thousand electronic devices, more than one million electronic devices, etc. Any desired subset of the electronic devices may be colocated in a common physical environment (e.g., devices 10B-1 and 10B-2 in FIG. 3). Each electronic device in the multiuser communication session may have a respective user.

The electronic devices in the multiuser communication session may communicate via network 46. Each electronic device may have a respective multiuser communication session engine in their respective control circuitry (see FIG. 1). The multiuser communication session engine for each local multiuser communication device may control the content presented on that device based on inputs to the device and information received from other devices (e.g., via network 46). In some multiuser communication sessions, one participating electronic device may serve as a master device that provides content to the other electronic devices in the multiuser communication session. This need not be the case, and each electronic device may instead generate its own content based on various inputs.

If desired, the multiuser communication session may include a multiuser communication session engine 50' that is not associated with a participating electronic device. The multiuser communication session engine 50' may communicate with the electronic devices via network 46. The multiuser communication session engine 50' may receive input(s) from one or more electronic devices in the multiuser communication session and provide corresponding XR content to one or more of the electronic devices. The multiuser communication session engine 50' may manage the XR content provided to each of the devices in the session. In other words, in one example the multiuser communication session engine 50' serves as a master device that provides content to the other electronic devices in the multiuser communication session. The multiuser communication session engine 50' may be implemented on one or more standalone data processing apparatus (e.g., an external server) or a distributed network of computers.

Consider a first example where electronic device 10A serves as a master device for the multiuser communication session. The multiuser communication session engine in device 10A may initiate the multiuser communication session and control the content included in the XR environment for the multiuser communication session. Device 10A sends the information regarding the XR environment to the other devices in the session (e.g., devices 10B-1, 10B-2, and 10C). The other devices (10B-1, 10B-2, and 10C) may use their respective multiuser communication session engine to present the XR environment to their respective user. Each device (10B-1, 10B-2, and 10C) may be capable of customizing the presentation of the XR environment if desired. However, updates to the XR environment may continuously be received from master device 10A.

Consider a second example where multiuser communication session engine 50' serves as the master device for the multiuser communication session. Multiuser communication session engine 50' may send information regarding the XR environment to the other devices in the session (e.g., devices 10A, 10B-1, 10B-2, and 10C). The devices (10A, 10B-1, 10B-2, and 10C) may use their respective multiuser communication session engine to present the XR environment to their respective user. Each device (10A, 10B-1, 10B-2, and 10C) may be capable of customizing the presentation of the XR environment if desired. However, updates to the XR environment may continuously be received from master device 50'.

The example of a single device serving as a master device for the multiuser communication session is merely illustrative. Alternatively, the devices may exchange information in a non-hierarchical manner or two or more devices in the multiuser communication session may have a higher priority in controlling content in the multiuser communication session than the remaining devices in the multiuser communication session.

Figure 4:
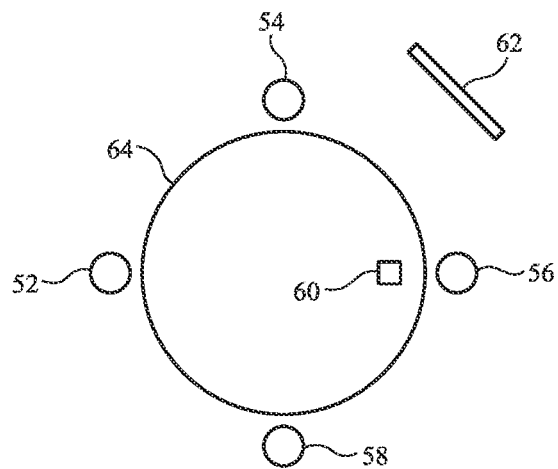
FIG. 4 is a top view of an illustrative extended reality (XR) environment for a multiuser communication session in accordance with some embodiments.

FIG. 4 is a top view of an illustrative XR environment for a multiuser communication session. In this XR environment, users are positioned around a circular table 64 in a virtual room. Each user has an associated virtual representation (sometimes referred to as an avatar) within the XR environment. A virtual object 60 is present on the virtual table. An application window 62 (e.g., a presentation document, video, simulated whiteboard, or other application) is also present in the XR environment.

In FIG. 4, user 68A of electronic device 10A is represented by avatar 58, user 68B-1 of electronic device 10B-1 is represented by avatar 52, user 68B-2 of electronic device 10B-2 is represented by avatar 54, and user 68C of electronic device 10C is represented by avatar 56.

There are many options for the appearance of the avatar of each user. The avatar may depict real-time actions of the corresponding user, including movement, updated location, and/or interactions with various physical components and/or virtual components within the multiuser communication session XR environment. For example, if user 68A (represented by avatar 58) raises their hand, avatar 58 may raise its hand. If user 68A looks to their right, avatar 58 may look to its right. If user 68A stands up, avatar 58 may stand up.

An avatar may or may not mimic facial expressions of the user. For example, if user 68A (represented by avatar 58) smiles, avatar 58 may smile. If user 68A frowns, avatar 58 may frown.

An avatar may or may not mimic physical characteristics of the user. For example, the avatar may have an animated appearance with customizable characteristics (e.g., hair color, hair style, eye color, etc.). For example, user 68A may customize the appearance of avatar 58 (e.g., changing the hair style from long to short). Alternatively, the avatar may use an actual image of the user to represent the face of the user. For example, an image of at least a portion of user 68A's face (optionally captured by one or more sensors in electronic device 10A) may be used to represent the face of avatar 58.

In the previous examples, the avatar may have an appearance of a person (e.g., the avatar has a torso, head, arms, etc.). This example is merely illustrative. The avatar may alternatively be another symbol (e.g., a circle or sphere) that represents the user without having the appearance of a person.

Figure 5A:
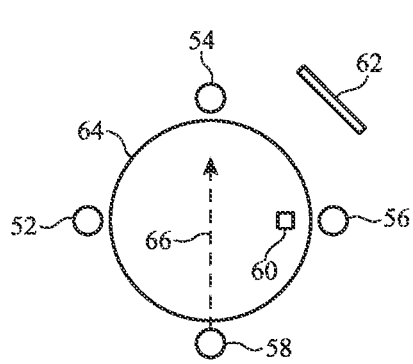
FIGS. 5A, 6A, 7A, 8A, 9A, 10A, and 11A are top views of the illustrative XR environment of FIG. 4 showing different viewpoints in accordance with some embodiments.
Figure 5B:
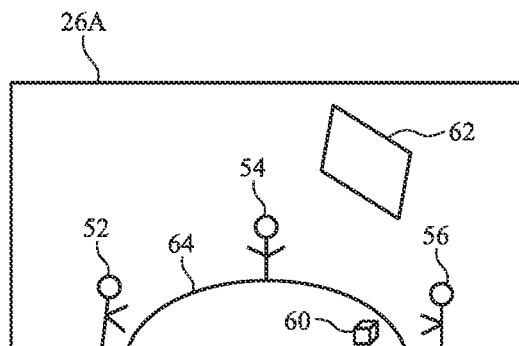
FIGS. 5B, 6B, 7B, 8B, 9B, 10B, and 11B show illustrative views for users at the viewpoints in FIGS. 5A, 6A, 7A, 8A, 9A, 10A, and 11A, respectively, in accordance with some embodiments.

Each user in the multiuser communication session may have a view of the same XR environment shown in FIG. 4. Each user in the multiuser communication session may have a viewpoint positioned within the three-dimensional XR environment. Consider the example of FIG. 5A where user 68A (represented by avatar 58) looks in direction 66 towards avatar 54. The view for the user (as presented on display 26A in electronic device 10A) is shown in FIG. 5B. As shown in FIG. 5B, the user views avatar 54 in front of them, avatar 52 to their left, avatar 56 (with virtual object 60) to their right, and application window 62 behind avatars 54 and 56. The spatial relationship between the virtual objects in the XR environment is maintained for the other users in the multiuser communication session.

Figure 6A:
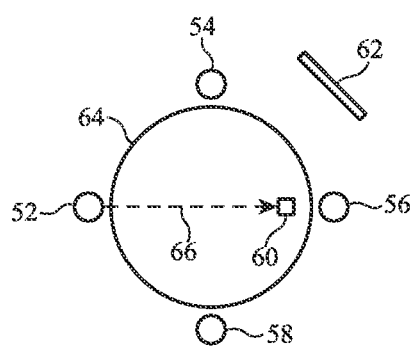
Figure 6B:
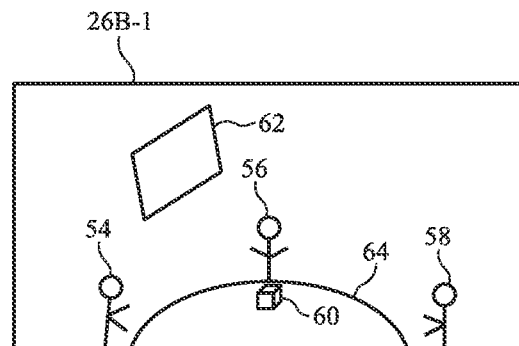

Consider the example of FIG. 6A where user 68B-1 (represented by avatar 52) looks in direction 66 towards avatar 56. The view for the user (as presented on display 26B-1 in electronic device 10B-1) is shown in FIG. 6B. As shown in FIG. 6B, the user views avatar 56 (with virtual object 60) in front of them, avatar 54 to their left, avatar 58 to their right, and application window 62 behind avatars 54 and 56.

Figure 7A:
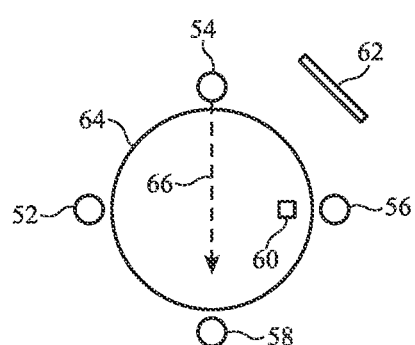
Figure 7B:
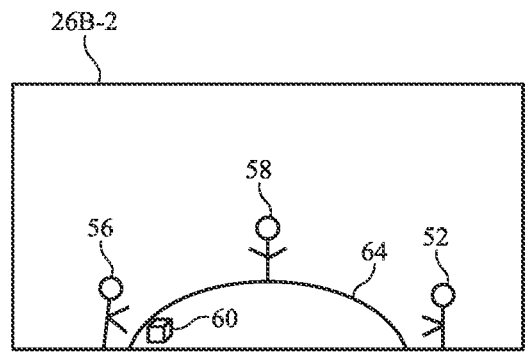

Consider the example of FIG. 7A where user 68B-2 (represented by avatar 54) looks in direction 66 towards avatar 58. The view for the user (as presented on display 26B-2 in electronic device 10B-2) is shown in FIG. 7B. As shown in FIG. 7B, the user views avatar 58 in front of them, avatar 56 (with virtual object 60) to their left, and avatar 52 to their right. Application window 62 is not within the field-of-view of user 68B-2 and therefore application window 62 is not depicted on display 26B-2 in FIG. 7B.

Figure 8A:
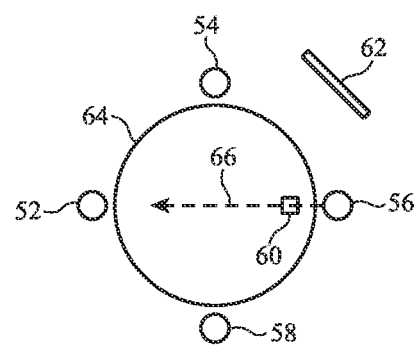
Figure 8B:
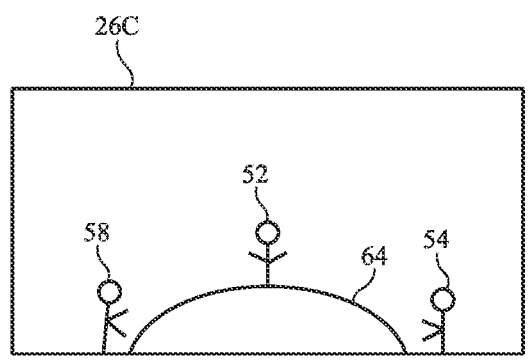

Consider the example of FIG. 8A where user 68C (represented by avatar 56) looks in direction 66 towards avatar 52. The view for the user (as presented on display 26C in electronic device 10C) is shown in FIG. 8B. As shown in FIG. 8B, the user views avatar 52 in front of them, avatar 58 to their left, and avatar 54 to their right. Virtual object 60 is not within the field-of-view of user 68C and therefore virtual object 60 is not depicted on display 26C in FIG. 8B. Application window 62 is not within the field-of-view of user 68C and therefore application window 62 is not depicted on display 26C in FIG. 8B.

FIGS. 5-8 show how the spatial relationship between the virtual objects in the XR environment is maintained across different users in the multiuser communication session. In addition, the spatial relationship between the virtual objects in the XR environment may be maintained as a given user changes their head pose (and, correspondingly, the portion of the XR environment being viewed). Head pose may be characterized by both location (e.g., a position within a three-dimensional coordinate system) and orientation (e.g., pitch, roll, and yaw). Changes in location of the user's head may correspondingly change the user's viewpoint within the representation of the three-dimensional XR environment. Changes in orientation of the user's head may correspondingly change the user's field of view within the representation of the three-dimensional XR environment.

Figure 9A:
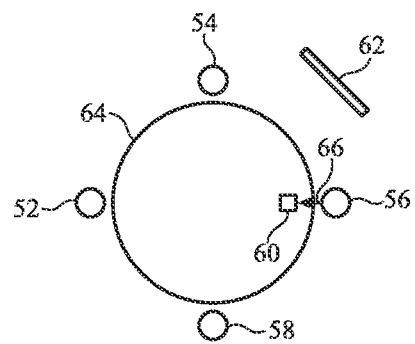
Figure 9B:
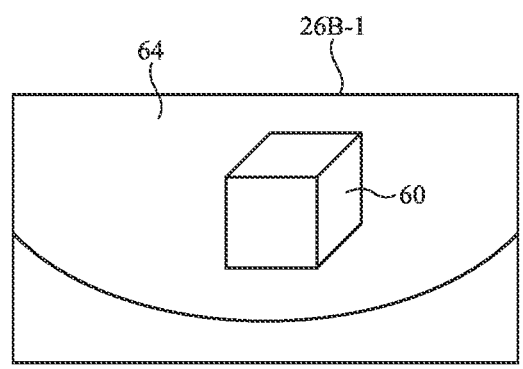

For example, consider FIG. 9A where user 68B-1 (represented by avatar 56) changes their head pose (e.g., head orientation) to look in direction 66 towards virtual object 60. The corresponding view for user 68B-1 (as presented on display 26B-1 in electronic device 10B-1) is shown in FIG. 9B. As shown, the user views virtual object 60 on table 64.

Figure 10A:
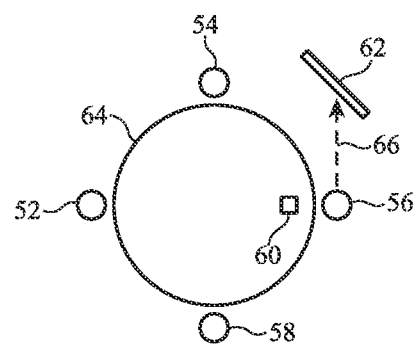
Figure 10B:
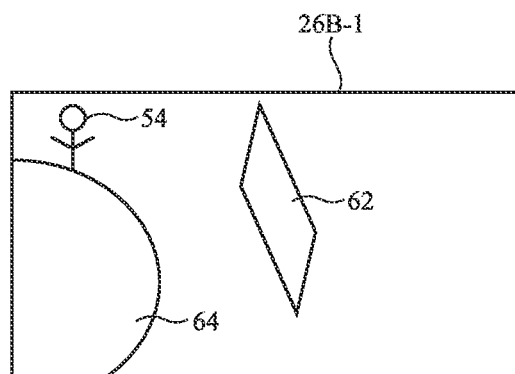

Consider FIG. 10A where user 68B-1 (represented by avatar 56) changes their head pose (e.g., head orientation) to look in direction 66 towards application window 62. The corresponding view for user 68B-1 (as presented on display 26B-1 in electronic device 10B-1) is shown in FIG. 10B. As shown, the user views application window 62 and avatar 54 and table 64 to the left of the application window.

Figure 11A:
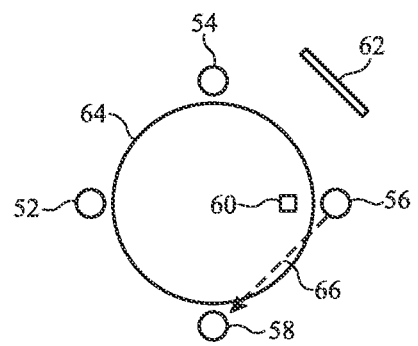
Figure 11B:
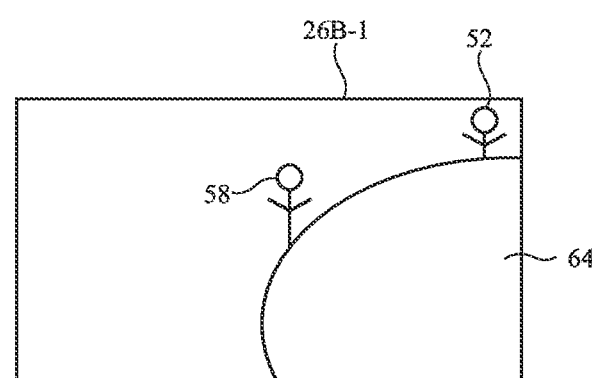

Consider FIG. 11A where user 68B-1 (represented by avatar 56) changes their head pose (e.g., head orientation) to look in direction 66 towards avatar 58. The corresponding view for user 68B-1 (as presented on display 26B-1 in electronic device 10B-1) is shown in FIG. 11B. As shown, the user views avatar 58 and avatar 52 to the right of avatar 58.

It should be noted that the displayed content in FIGS. 5B, 6B, 7B, 8B, 9B, 10B, and 11B may be stereoscopic (three-dimensional) content (e.g., in devices with stereoscopic displays capable of displaying three-dimensional content).

As demonstrated by FIGS. 8-11, a user may look around the XR environment for the multiuser communication session as if the XR environment was a physical room. Certain objects in the XR environment may pass in and out of the user's field-of-view depending on their head pose, but the spatial relationship between the objects in the XR environment is continuously maintained (e.g., when the user turns away from virtual object 60 on table 64 and then turns back to the virtual object, the virtual object 60 is at the same position on table 64). Each user in the multiuser communication session also has a representative avatar. In this way, the multiuser communication session in the virtual room simulates the users being present in a physical room. The virtual room enables the users to have similar interactions as in a common physical room (e.g., looking at a specific person, giving non-verbal cues, looking at common content such as virtual object 60 or application window 62) even though the users may be located in different physical environments.

In the examples of FIGS. 3-11, there is no hierarchy amongst the devices in the multiuser communication session. In other words, every device in the multiuser communication session is presented the same XR environment (simulating all of the users being present in the same physical room). Each user may have full range of motion within the XR environment, may control virtual content in the XR environment such as virtual objects (e.g., virtual object 60) and applications (e.g., in application window 62), etc. There is no delineation in the user experience for any of the users in the multiuser communication session. This type of multiuser communication session (with no hierarchy amongst the devices) may be referred to as a collaborative multiuser communication session, a non-hierarchical multiuser communication session, etc.

Figure 12:
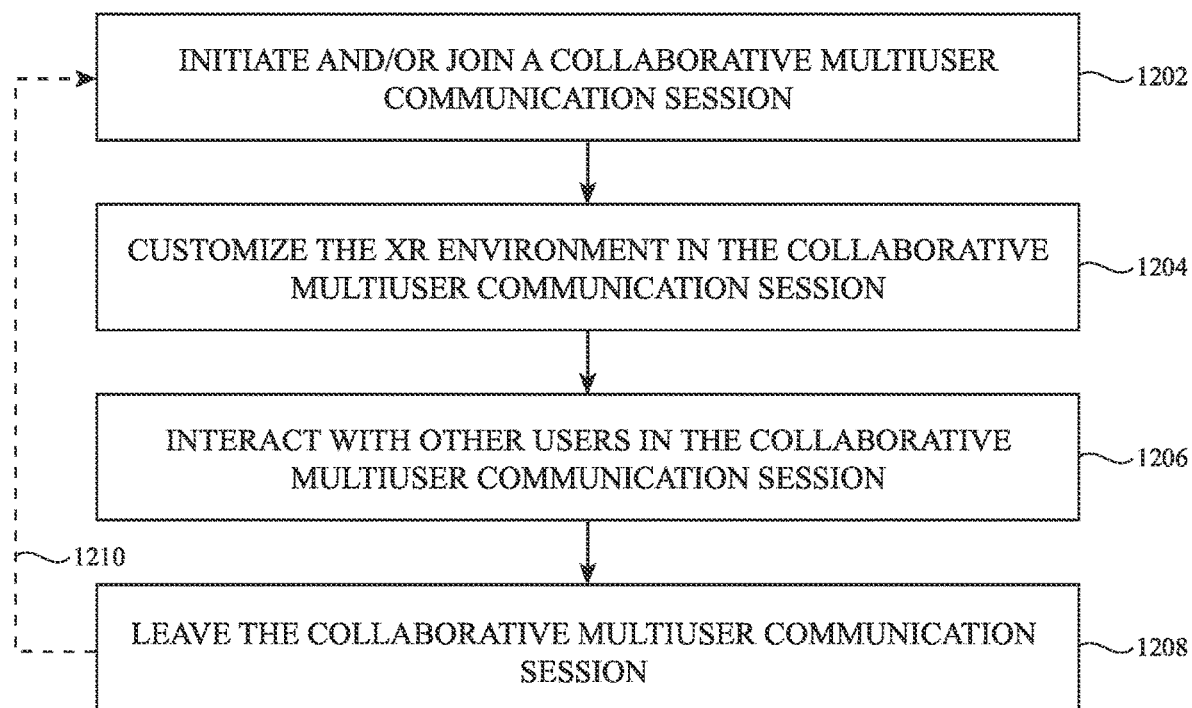
FIG. 12 is a flowchart showing an illustrative method for participating in a multiuser communication session in accordance with some embodiments.

FIG. 12 is a flowchart showing an illustrative method performed by a head-mounted device (e.g., control circuitry 16 in device 10). The blocks of FIG. 12 may be stored as instructions in memory of electronic device 10, with the instructions configured to be executed by one or more processors in the electronic device.

At block 1202, control circuitry 16 may initiate and/or join a collaborative multiuser communicator session. Initiating and/or joining the collaborative multiuser communicator session may cause display 26 to present an extended reality environment to the user that represents the multiuser communication session. A user may provide user input to join an existing collaborative multiuser communication session (e.g., by clicking on a link). A user may provide user input to initiate a new collaborative multiuser communication session. One or more other users may already be present in the multiuser communication session at block 1202 and/or one or more other users may join the multiuser communication session at block 1202 after the local user initiates/joins the multiuser communication session. Each user in the collaborative multiuser communication session may be represented by an avatar.

At block 1204, control circuitry 16 may (based on user input) customize the presented XR environment in the collaborative multiuser communication session. There are a wide variety of customizations the control circuitry may make to the XR environment. The control circuitry may customize the appearance of the avatar for the local user of electronic device 10 or remote users in the collaborative multiuser communication session (e.g., by changing physical characteristics of the avatar, adjusting the similarity in appearance of the avatar to the local or remote user, adjusting the avatar to a generic shape such as a circle, etc.). The control circuitry may customize the appearance of the virtual room of the XR environment. For example, in the example of FIG. 4 the XR environment includes a virtual room with a circular table. At block 1204, the control circuitry 16 may update the virtual room to include a table of a different size/shape, may change the aesthetics of the virtual room, etc. The control circuitry 16 may customize the applications and other virtual objects present in the virtual room of the XR environment.

The control circuitry may select applications to use in the virtual room at block 1204. For example, the control circuitry may select an application with associated application window 62 and position the application window 62 within the virtual room. The control circuitry may select an additional application with an associated virtual object (e.g., a chess board) and place the virtual object accordingly (e.g., on the table).

The changes to the XR environment made at block 1204 may propagate to the XR environment presented to each other user in the collaborative multiuser communication session. For example, if control circuitry 16 changes the aesthetic of the virtual room at block 1204, the aesthetic of the virtual room presented to all of the other users will be updated accordingly.

Also at block 1204, changes to the XR environment made by other participants in the collaborative multiuser communication session may be received (e.g., using network 46) and implemented in the presented XR environment.

At block 1206, control circuitry 16 may, based on user input, interact with devices of other users in the collaborative multiuser communication session. For example, control circuitry 16 may obtain audio data (e.g., the voice of a local user) from a microphone in the head-mounted device and transmit the audio data to the other devices in the session so that the local user's voice is heard by the other users. Simultaneously, control circuitry 16 may play audio (e.g., corresponding to the other users' voices) using a speaker in electronic device 10. In other words, the user may directly communicate with other participants in the multiuser communication session at block 1206 (e.g., using audio communication).

As another example, control circuitry 16 may identify a facial expression for the user (e.g., using one or more sensors in head-mounted device) and update the appearance of the user's avatar based on the identified facial expression. Concurrently, control circuitry 16 may display avatars for the other users (with corresponding facial expressions) using a display in electronic device 10.

At block 1208, control circuitry 16 may (based on user input) leave the collaborative multiuser communication session. The multiuser communication session may, in some cases, be a one-time session that is not saved after all of the users leave the session. Alternatively, the multiuser communication session may, in some cases, be a persistent session that may be rejoined at a later time (e.g., as indicated by feedback loop 1210). For example, consider the example where multiple users join the collaborative multiuser communication session and work on solving a problem using a virtual whiteboard. The content on the virtual whiteboard and arrangement of the XR environment may be saved at the end of the multiuser communication session. Subsequently (e.g., the next day), one or more of the users may rejoin the multiuser communication session and the saved white board content and arrangement of the XR environment will still be present (e.g., in the same state as when the session ended the previous day).

In some multiuser communication sessions, there may be a hierarchy between participating devices. For example, a multiuser communication session may be used in a presentation where at least one participant has a presenter role and other participants have an audience member role. In this type of application, the device for the presenter may have a different view of the XR environment than the audience members, may have controls for the XR environment that are not available to the audience members, etc. These types of multiuser communication sessions (with a hierarchy between the devices) may be referred to as theater multiuser communication sessions, presentation multiuser communication sessions, hierarchical multiuser communication sessions, etc.

Figure 13:
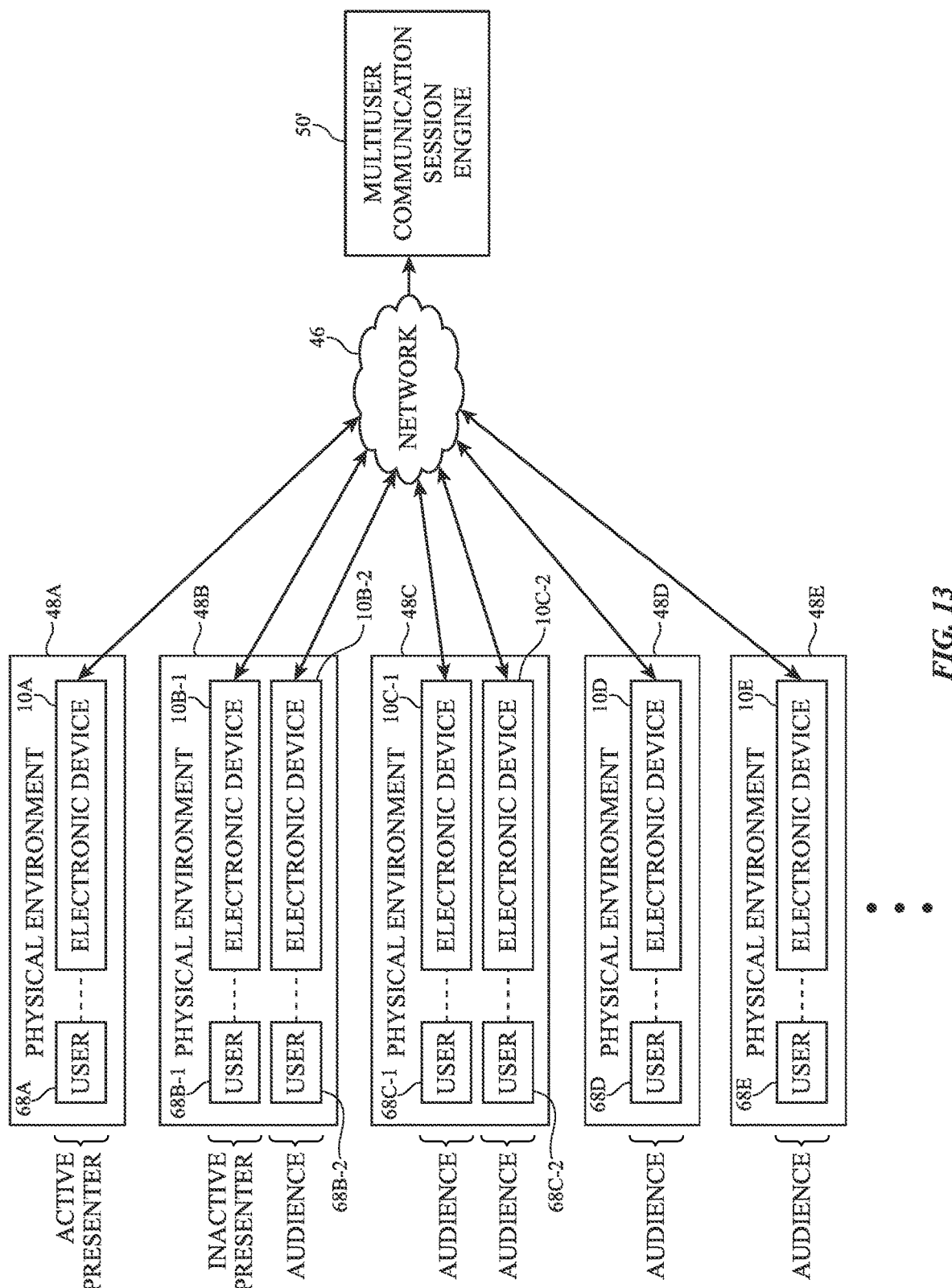
FIG. 13 is a schematic diagram of an illustrative hierarchical multiuser communication session in accordance with some embodiments.

A schematic diagram of an illustrative hierarchical multiuser communication session is shown in FIG. 13. As shown in FIG. 13, multiple electronic devices 10 are connected via network 46 during the multiuser communication session. Some of the electronic devices (and corresponding users) may be located in different physical environments. As shown in FIG. 13, a user 68A with electronic device 10A is present in physical environment 48A, users 68B-1 and 68B-2 with electronic devices 10B-1 and 10B-2, respectively, are present in physical environment 48B, users 68C-1 and 68C-2 with electronic devices 10C-1 and 10C-2, respectively, are present in physical environment 48C, user 68D with electronic device 10D is present in physical environment 48D, and user 68E with electronic device 10E is present in physical environment 48E. Similar to as discussed in connection with FIG. 3, the electronic devices (and optionally, multiuser communication session engine 50') in the multiuser communication session of FIG. 13 may communicate via network 46.

In the example of FIG. 13, user 68A with device 10A has the role of active presenter. User 68B-1 with device 10B-1 has the role of inactive presenter. Users 68B-2, 68C-1, 68C-2, 68D, and 68E have the role of audience member. The user experience for each one of these roles (active presenter, inactive presenter, and audience member) may be different. Any number of different users (optionally having different roles) may be located in the same physical environment. For example, two active presenters may be located in the same physical environment, an active presenter and an inactive presenter may be located in the same physical environment, etc. The term presenter (or presenter role) may sometimes be used to collectively refer to both active and inactive presenters (or active and inactive presenter roles).

There is not necessarily a one-to-one correlation between active users in the hierarchical multiuser communication session and the number of avatars depicted in the XR environment. Because the size of the audience for the hierarchical multiuser communication session is not limited by a physical room, there may be hundreds of thousands of audience members for the hierarchical multiuser communication session. In the collaborative multiuser communication session depicted in FIG. 4, each user has a corresponding avatar in the XR environment. In the hierarchical multiuser communication session of FIG. 13, this one-to-one correlation between participants and avatars in the XR environment may not be practical or desirable (particularly when the number of audience members increases). Instead, each user may receive generalized feedback (e.g., visual and/or audio feedback) representative of the audience members.

A participant in the hierarchical multiuser communication session may have their role changed during the hierarchical multiuser communication session. This may be referred to as role promotion or role demotion. For example, a given user may be promoted from the role of audience member to the role of presenter, a given user may be demoted from the role of presenter to the role of audience member, etc.

There are a wide variety of different uses cases for a hierarchical multiuser communication session of this type.

In an educational setting, a professor may lecture a plurality of students. The professor may have the role of an active presenter whereas each student has the role of audience member. If the professor wishes to engage a specific student (e.g., for a demonstration), that student may be temporarily promoted from an audience member to an active presenter than demoted back to an audience member.

In a town hall setting, a speaker may have the role of an active presenter. A moderator for the town hall setting may have the role of inactive presenter. Other viewers may have the role of audience members. The moderator may selectively promote certain participants (audience members) to the role of active presenter to allow those participants to speak to the entire group.

In a comedy show, a comedian currently performing may have the role of an active presenter. A moderator for the event may have the role of an inactive presenter. The next comedian to perform may have the role of inactive presenter. The remaining audience has the role of audience members.

In a musical performance, the musical artist may have the role of active presenter. The remaining audience has the role of audience members.

In a magic show, a magician may have the role of active presenter. The magician may have an assistance with the role of inactive presenter. The remaining audience has the role of audience members. The magician may wish to bring an audience member onto a virtual stage by promoting the audience member to the role of active presenter.

In a professional setting, a CEO may give a presentation about a newly released product. The CEO may have the role of active presenter. The CEO may call on a technical expert to explain a technical aspect of the product. Before the technical expert is called on to speak, the technical expert may have the role of inactive presenter. When the technical expert is called on the speak, the technical expert may be promoted to the role of active presenter. The remaining audience has the role of audience members.

Figure 14:
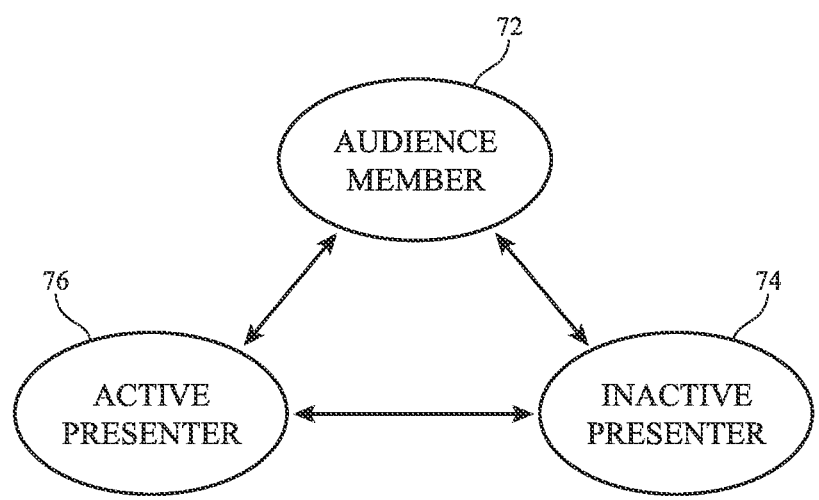
FIG. 14 is a state diagram of illustrative roles in a hierarchical multiuser communication in accordance with some embodiments.

FIG. 14 is a state diagram illustrating how a user's role in the hierarchical multiuser communication session may be switched between any of the available roles. In the example of FIG. 14, the available roles are audience member 72, inactive presenter 74, and active presenter 76. Each one of the roles may switch to any of the other roles at any time. One or more participants of varying roles may optionally need to approve the role change before the role change occurs. In other examples, more, fewer, or different roles may be defined for a hierarchical multiuser communication session.

In one example a presenter (active presenter 76 or inactive presenter 74) may request that an audience member 72 is promoted to a presenter role. In this case, the audience member 72 may receive a prompt to approve the requested role change. If the audience member accepts the requested role change, they may be promoted to the presenter role. Upon accepting the presenter role, the participant may be brought onto a virtual stage for the hierarchical multiuser communication session. If the audience member declines the requested role change, they may remain in the audience member role. When brought onto the virtual stage, the participant may view the session from a perspective on the virtual stage. An avatar for the participant may be visible on the virtual stage to other audience members in the virtual audience. While the participant has the audience member role, the participant may be unable to directly communicate with the active presenter. While the participant has the presenter role, the participant may be able to directly communicate with the active presenter.

In another example, an audience member 72 may request a promotion to a presenter role (e.g., active presenter 76 or inactive presenter 74). One or more participants having the presenter role may receive a prompt to approve the requested role change of the audience member from the audience member role to a presenter role. If the presenter accepts the requested role change, the requesting audience member is promoted to the presenter role. Upon promotion to the presenter role, the participant may be brought onto a virtual stage for the hierarchical multiuser communication session. If the presenter declines the requested role change, the requesting audience member may remain in the audience member role.

In another example, a participant having the active presenter role may switch themselves to the inactive presenter role (or vice versa) without needing any additional approval.

Figure 15:
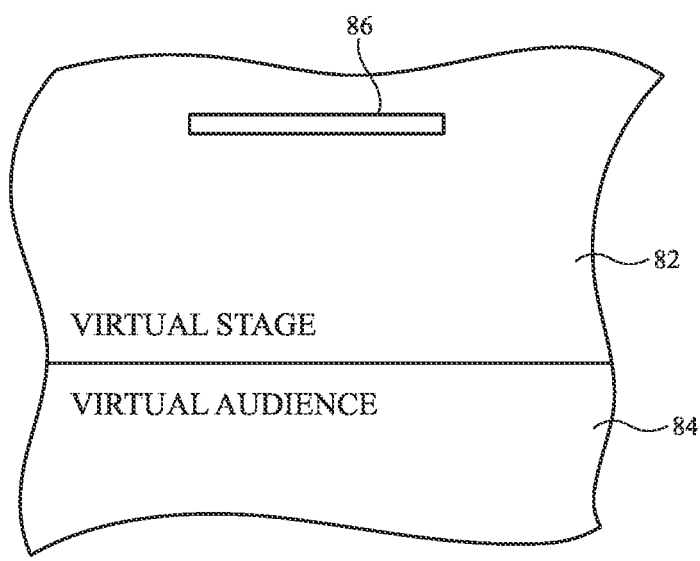
FIG. 15 is a top view of an illustrative XR environment for a hierarchical multiuser communication session in accordance with some embodiments.

There may be an XR environment associated with the hierarchical multiuser communication session. FIG. 15 is a top view of an illustrative XR environment that may be presented to participants in a hierarchical multiuser communication session. As shown in FIG. 15, the XR environment includes a virtual stage 82 and a virtual audience 84. In general, each user may be presented with a representation of the three-dimensional XR environment from a viewpoint positioned within the three-dimensional representation of the XR environment. The viewpoint of participants having the presenter role may be positioned on the virtual stage whereas the viewpoint of participants having the audience member role may be positioned in the virtual audience.

In FIG. 15, an application window 86 is included on the virtual stage. A presenter may, for example, present a slideshow presentation using the application window while standing on the virtual stage.

Each participant in the multiuser communication session may have a head-mounted device that presents an XR environment. The presentation of the XR environment may differ for the presenter and the audience members. Certain portions of the XR environment (e.g., the application window 86) may be consistent across all participants in the multiuser communication session. In other words, the application window 86 appears the same to all participants. Other portions of the XR environment may not be consistent across all participants in the multiuser communication session. For example, a first audience member may select a first color for the virtual stage in the XR environment presented to the first audience member whereas a second audience member may select a second color for the virtual stage in the XR environment presented to the second audience member.

Figure 16:
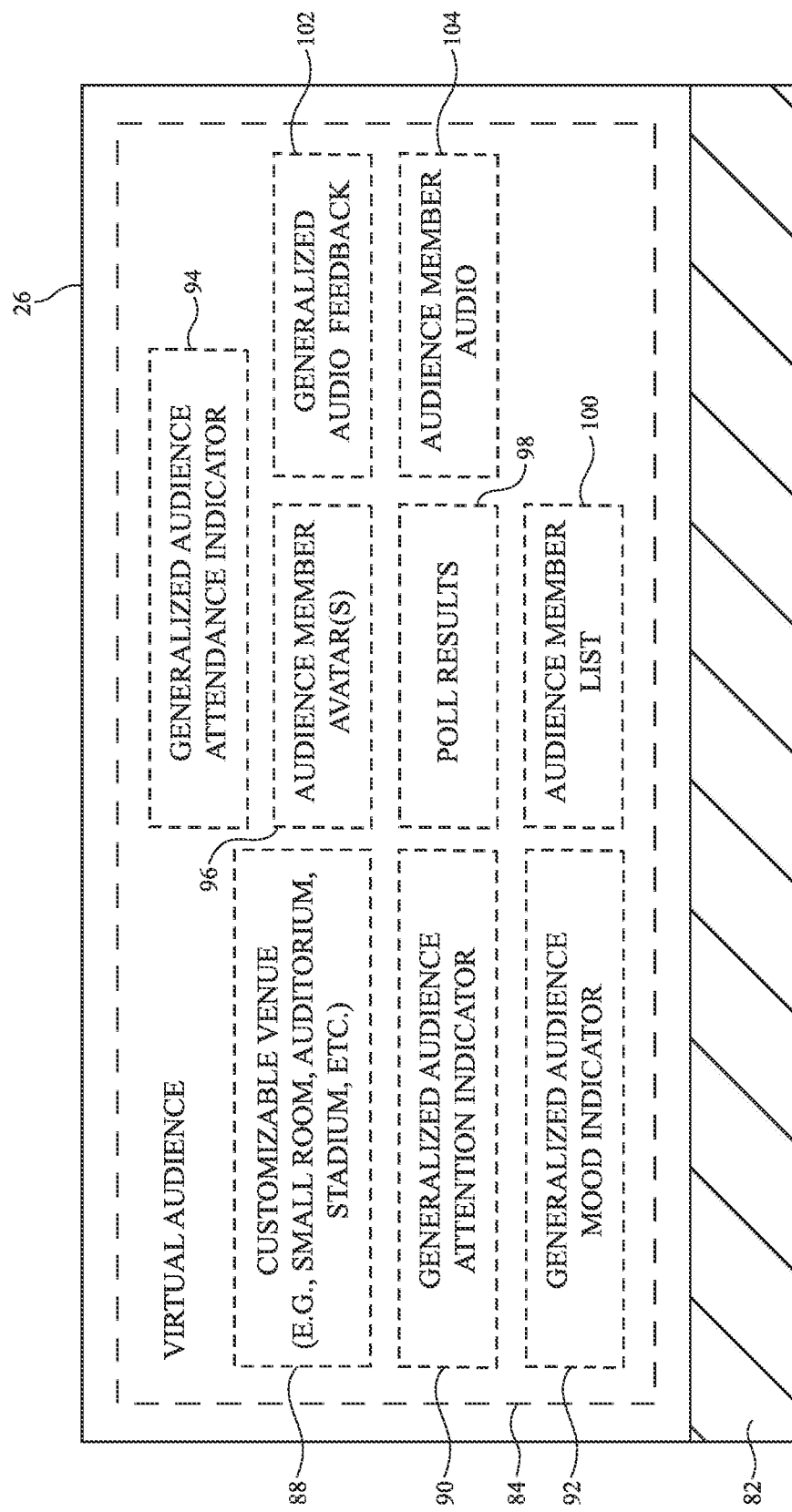
FIG. 16 is an example of an illustrative representation of an XR environment for a presenter in a hierarchical multiuser communication session in accordance with some embodiments.

For a participant having the presenter role, the appearance of the virtual audience in the XR environment may be customizable. FIG. 16 is an example of a view on display 26 for a presenter in the multiuser communication session. As shown in FIG. 16, the XR environment presented to the presenter may include a virtual stage 82. The perspective of the view presented to the presenter is from on the virtual stage. The presented XR environment also includes a representation of virtual audience 84.

The representation of the virtual audience may include a customizable venue 88. Possible customizable attributes for the customizable venue include the size of the venue (e.g., a small room, an auditorium, a stadium, etc.), the set-up and appearance of virtual objects within the venue (e.g., the number and type of chairs present in the venue), aesthetic attributes of the venue (e.g., the color of the walls, the type of floor), etc. As a few illustrative examples, a musician for a concert may select an outdoor stadium as the customizable venue, a college professor giving a lecture may select an indoor auditorium as the customizable venue, and an employee administering a training may select a small indoor room as the customizable venue.

The presenter may choose from a list of predetermined venues to determine the customizable venue 88 or may select each attribute of the customizable venue individually. If a predetermined venue is selected, the presenter may optionally further customize the venue after selecting the predetermined venue.

In presentations to an audience in a physical environment, a presenter is able to directly observe the audience members. This allows the presenter to gauge the mood, attention, and attendance of the audience as a whole or for specific members in the virtual audience. Assessing the audience reactions in real time in this manner may enable the presenter to tailor their presentation to the audience based on the real time audience reactions.

To simulate this type of experience in the XR environment for the multiuser communication session, the presentation of the virtual audience to the presenter may include generalized feedback based on participants of the multiuser communication session having the audience member role. Generalized feedback refers to feedback that is based on information from the audience members without specifically identifying any individual audience members or providing information that is attributable to a specific audience member.

For example, the representation of virtual audience 84 may include a generalized audience attention indicator 90 (sometimes referred to as generalized visual audience attention indicator 90). The generalized audience attention indicator 90 may represent an average attention level for the audience members. Some examples of an appearance for the generalized audience attention indicator are text, a slider, a percentage, avatar appearance for audience members, etc. The text may state "The attention level for the audience is: high," "The attention level for the audience is: moderate," or "The attention level for the audience is: low," as examples. The slider may represent the audience attention on a sliding scale from low to high. The number may represent the percentage of the audience that is indicated to have a high attention level, an average relative attention level for the audience members, etc. As another example, a given percentage of the individual avatars in the audience (matching the percentage of audience members with a high attention level) may be provided with an attentive appearance.

The assessment of the average attention level for the audience members may be based on data received from the electronic device 10 used by each audience member. Average attention level may be determined based on gaze detection data (e.g., how often is the user looking at the presenter and/or virtual stage), application data (e.g., is the user multitasking by using other applications in parallel with viewing the presentation), or other desired sensor data. Sensor data from the electronic device 10 may, for example, indicate whether a user is reacting to the presentation (e.g., by detecting laughing or other changes in facial expression).

In some cases, each electronic device used by an audience member may output an attention level assessment (e.g., low, moderate, high, a percentage or other quantitative measure of attention level, etc.) without including raw data. In this case, multiuser communication session engine 50' or the multiuser communication session engine on the device of the presenter may use the attention level assessment from each audience member to determine a generalized attention level assessment that is then presented in the generalized audience attention indicator 90.

In other cases, each electronic device used by an audience member may output raw data that is indicative of attention level (e.g., gaze detection data, other sensor data, application data, etc.). In this case, multiuser communication session engine 50' or the multiuser communication session engine on the device of the presenter may use the raw data to determine a generalized attention level assessment that is then presented in the generalized audience attention indicator 90.

The presence and appearance of indicator 90 in virtual audience 84 may be customizable. For example, the presenter may change the size and appearance of indicator 90 and may optionally remove the indicator entirely.

The representation of virtual audience 84 may include a generalized audience mood indicator 92 (sometimes referred to as generalized visual audience mood indicator 92). The generalized audience mood indicator 92 may represent an average mood for the audience members. Some examples of an appearance for the generalized audience mood indicator are text, a slider, an emoji or other representation of a face, a percentage, audience member avatar appearance, etc. The text may state "The mood for the audience is: happy," "The mood for the audience is: serious," or "The mood for the audience is: sad," as examples. The slider may represent the audience mood on a sliding scale (e.g., from sad to happy). The number may represent the percentage of the audience that is indicated to have a happy mood, an average relative happiness for the audience members, etc. In one example, percentages may be listed for multiple moods (e.g., Happy: 50% of audience, serious: 40% of audience, etc.). The representation of the face may be, for example, a grinning face emoji, a sad face emoji, a crying face emoji, etc. As another example, a given percentage of the individual avatars in the audience (matching the percentage of audience members with a happy mood) may be provided with a happy appearance.

In some cases, audience members may provide feedback during the presentation. For example, the audience members may select a heart icon or a thumbs-down icon to reflect their reaction to the presentation. This type of audience feedback may also be reflected in the generalized audience mood indicator 92. For example, the generalized audience mood indicator may display when any audience member has selected the heart icon or the thumbs-down icon.

The assessment of the average mood for the audience members may be based on data received from the electronic device 10 used by each audience member. Average mood may be determined based on facial expression data (e.g., obtained using one or more cameras in electronic device 10), biometric data (e.g., heart rate), or other desired sensor data.

In some cases, each electronic device used by an audience member may output a mood assessment (e.g., happy, serious, sad, a percentage or other quantitative measure of mood, etc.) without including raw data. In this case, multiuser communication session engine 50' or the multiuser communication session engine on the device of the presenter may use the mood assessment from each audience member to determine a generalized mood assessment that is then presented in the generalized audience mood indicator 92.

In other cases, each electronic device used by an audience member may output raw data that is indicative of mood (e.g., facial expression data, biometric data, other sensor data, etc.). In this case, multiuser communication session engine 50' or the multiuser communication session engine on the device of the presenter may use the raw data to determine a generalized mood assessment that is then presented in the generalized audience mood indicator 92.

The presence and appearance of indicator 92 in virtual audience 84 may be customizable. For example, the presenter may change the size and appearance of indicator 92 and may optionally remove the indicator entirely.

The representation of the virtual audience may also include a generalized audience attendance indicator 94 (sometimes referred to as generalized audience attendance indicator 94). The generalized audience attendance indicator 94 may be based on a number of the participants of the multiuser communication session having the audience member role. For example, the generalized audience attendance indicator may be text displaying a number of audience members that are currently viewing the presentation, a percentage that represents the number of audience members relative to an expected number of audience members, a number of avatars shown in the virtual audience, etc. The expected number of audience members may be based on the size of the customizable venue 88, based on a number of audience members who have purchased tickets to the presentation or added the presentation to their calendar, etc. Other options are possible for the appearance of the generalized audience attendance indicator. For example, the indicator may have a circular slider that fills up proportionally to the percentage of the customizable venue that is occupied.

One or more audience member avatars 96 may be included in the virtual audience 84. In general, each avatar depicted in the virtual audience may or may not be associated with an individual audience member participating in the multiuser communication session. When the avatar is associated with an individual audience member participating in the multiuser communication session, the appearance and movements of the avatar may be updated in real time based on the appearance and movements of the associated individual audience member. When the avatar is not associated with an individual audience member participating in the multiuser communication session, the avatar may have a default appearance, a customizable appearance, or a random appearance. Similarly, the avatar may perform default movements, customizable movements, or random movements. Including avatars not associated with individual audience members may reduce processing burden on the system and enhance the customizable experience for the presenter.

In one possible arrangement, every avatar in the virtual audience may be associated with an individual audience member participating in the multiuser communication session. In another possible arrangement, a first subset of the avatars in the virtual audience are associated with an individual audience member participating in the multiuser communication session and a second subset of the avatars in the virtual audience are not associated with an individual audience member participating in the multiuser communication session. In another possible arrangement, none of the avatars in the virtual audience are associated with an individual audience member participating in the multiuser communication session.

The representation of the virtual audience may include poll results 98. The presenter may initiate a poll of the audience members and corresponding poll results may be displayed. The poll results may only be viewable to the presenter or may be viewable to both the presenter and the audience members.

An audience member list 100 may be included in the representation of the virtual audience. The audience member list may include names or other information (e.g., a username, a generic identifier, etc.) for specific participants of the multiuser communication session having the audience member role. In one example, audience member list 100 includes a list of all the names of the audience members. As another example, audience member list 100 includes user-selected usernames for all of the audience members. As yet another example, the audience member list includes names for some of the audience members and user-selected usernames for some of the audience members. As another example, the audience member list includes a list of anonymous identifiers (e.g., numbers) associated with individual audience members (e.g., audience member 1, audience member 2, audience member 3, etc.).

If desired, the audience member list may include individualized attention, mood, and/or avatar information. For example, the attention level of a given audience member may be included next to that audience member's name in the audience member list. The mood of a given audience member may be included next to that audience member's username in the audience member list. The mood and attention level of a given audience member may be listed next to that audience member's anonymous number.

The virtual audience 84 may include generalized audio feedback 102. The generalized audio feedback may include one of many prerecorded audience feedback options that is selected based on the number of audience members, the attention level of the audience members, the mood of the audience members, etc. The type and/or volume of the generalized audio feedback may be updated in real time or may be customized by the presenter. The generalized audio feedback 102 may exclude individual audio for any individual participant of the multiuser communication session having the audience member role. In other words, audio feeds from the audience members are not used to generate the generalized audio feedback.

The virtual audience 84 may also include audience member audio 104. The audience member audio may include audio from at least one participant of the multiuser communication session having the audience member role. The participant providing the audio may be identified (e.g., on audience member list 100) when the audio is presented. Audio from only one audience member may be provided to the presenter or audio from two or more audience members may be provided to the presenter.

It should be noted that each audience member may control what, if any, information from their device is used in the representation of virtual audience 84 to other participants (e.g., the presenter or other audience members) in the multiuser communication session. In other words, each audience member may opt in and opt out of contributing various information to the representation of virtual audience 84. An audience member may select whether to provide raw data indicative of their attention level, a determined attention level (without any raw data), or no information regrading attention level. An audience member may select whether to provide raw data indicative of their mood, a determined mood (without any raw data), or no information regarding mood. An audience member may select whether to make themselves eligible to be counted in a generalized audience attendance indicator. An audience member may select whether to make their avatar visible in the virtual audience, may customize the appearance of their avatar in the virtual audience, etc. An audience member may select whether to participate in poll requests from the presenter. An audience member may select whether to provide their name, their username, other identifying information, or no identifying information for an audience member list. An audience member may select whether to export microphone data from their electronic device for generalized audio feedback and/or individual audience member audio.

Consider an example where the presenter is a professor giving a lecture to a class of 10 students. The presenter may select application 86 to appear on the virtual stage (e.g., an application window for presenting a slideshow). The presenter may select a customizable venue 88 of a small room with 10 chairs for the presentation. The presenter may choose to omit the generalized audience attention indicator, the generalized audience mood indicator, and the generalized audience attendance indicator from the representation of the virtual audience. Each of the 10 students are audience members with corresponding avatars. Each avatar may be positioned in a corresponding chair in the customizable venue. The facial expressions of the avatars may be updated in real time based on the audience members' facial expressions. During the presentation, the presenter may ask a poll question and poll results 98 may be displayed in the virtual audience 84. The presenter may also display an audience member list 100 that includes a list of the names of the 10 students. Besides each of the 10 students' names is an attention level indicator and mood indicator associated with that student. In this way, the presenter has real time feedback on the mood and attention level of each audience member. Generalized audio feedback 102 may be omitted in favor of audience member audio 104. For example, the professor may ask a question to the students. When one of the students responds, the audio from that student is played for the presenter and a speaker icon may be displayed next to that student's name in the audience member list to identify which student is speaking.

Consider an example where the presenter is a comedian performing for a crowd of 200 audience members. The presenter may select a customizable venue 88 of an auditorium with 200 chairs for the presentation. The presenter may choose to display the generalized audience attention indicator 90 and the generalized audience mood indicator 92 to obtain real time feedback on the engagement and mood of the audience members. The presenter may display a generalized audience attendance indicator 94 that shows the percentage of the venue that is occupied (e.g., 50% when 100 audience members are present, 75% when 150 audience members are present, 100% when 200 audience members are present, etc.). The virtual audience includes a plurality of audience member avatars. The presenter may choose to populate all of the chairs in the venue with avatars, even if the venue is less than 100% full of audience members. For example, 100 audience members are participating in the multiuser communication session, 50 of which have opted in to include their avatars in the virtual audience. There may therefore be 50 avatars in the virtual audience that are individually controlled by audience members. An additional 50 avatars that are not individually controlled by audience members may be included in the virtual audience to accurately represent the actual attendance. Alternatively, an additional 150 avatars that are not individually controlled by audience members may be included in the virtual audience to give the venue an appearance of being full (e.g., to avoid distractions as the attendance increases, to allow the presenter to practice presenting to a larger audience, etc.). The presenter may elect to display an audience member list 100. The audience member list may be anonymous (e.g., audience member 1, audience member 2, audience member 3, etc.). For audience members that have opted in, attention and mood information may be displayed for the audience member. For example, it may be displayed that audience member 1 is happy and has a high attention level, audience member 2 has no associated mood or attention information (e.g., because the corresponding participant opted out), audience member 3 has a low attention level, etc. The comedian may receive generalized audio feedback in the form of a laugh track that is played at times when a given percentage of audience members laughs at or has a positive reaction to a joke. The volume of the laugh track in the generalized audio feedback may be increased based on the number of audience members with positive reactions and/or the intensity of the positive reactions.

Consider an example where the presenter is a singer performing a concert for 100,000 audience members. The presenter may select a stadium with 100,000 seats for the customizable venue 88. The virtual audience may include a generalized audience attention indicator 90 (e.g., a percentage of audience members with high attention levels) and a generalized audience mood indicator 92 (e.g., an emoji representing the average mood of the audience members). The virtual audience may include a generalized audience attendance indicator (e.g., the number of audience members may be displayed in text form). Avatars 96 may be included in the virtual audience. As an example, the number of avatars may be equal to the number of attendees (e.g., to have the avatars accurately reflect the attendance of the presentation) but none of the avatars are individually controlled by audience members. Audience member list 100 and audience member audio 104 may be omitted. Generalized audio feedback 102 may be presented to the presenter throughout the concert or at select times during the concert (e.g., after a song is completed).

Figure 17:
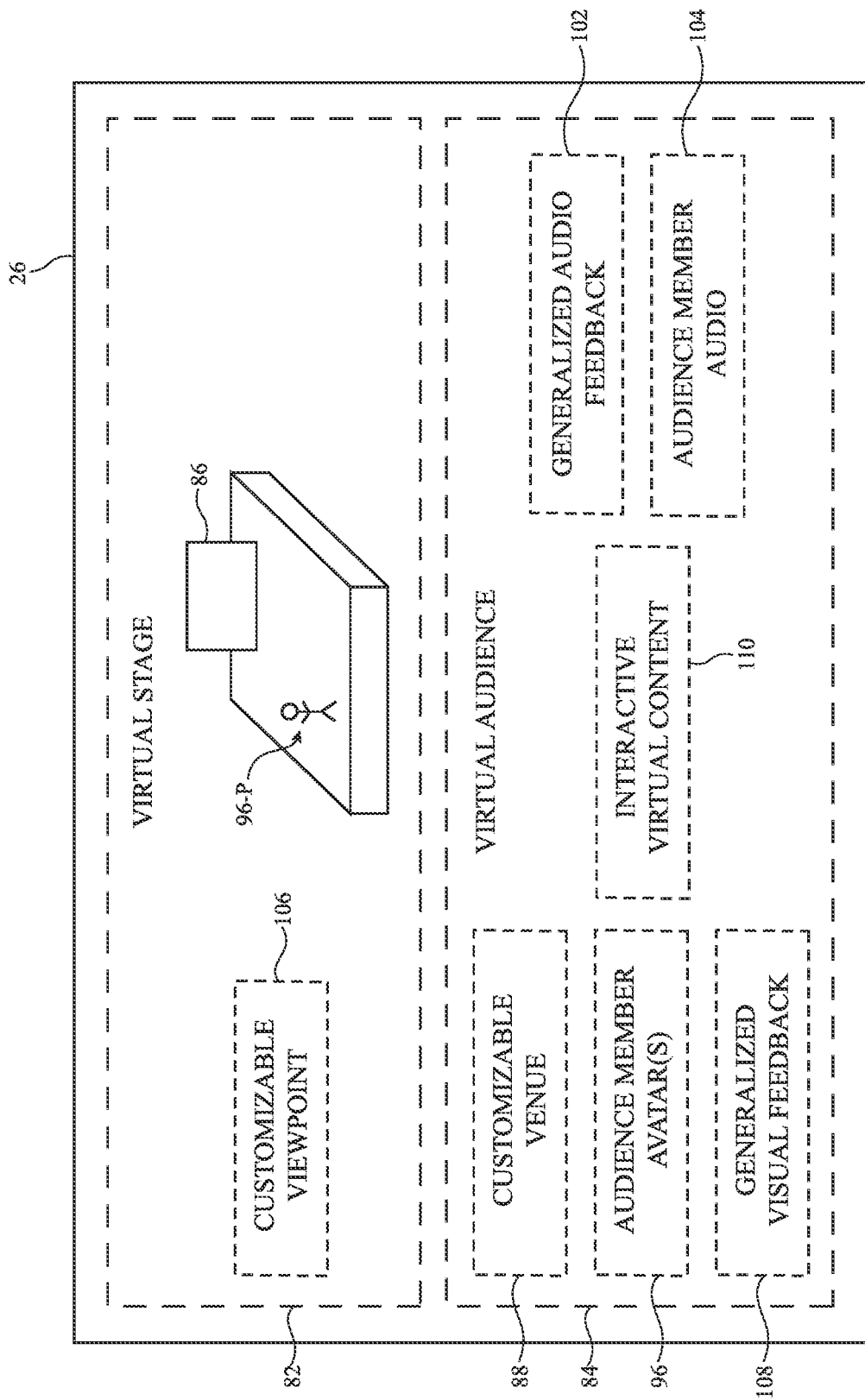
FIG. 17 is an example of an illustrative representation of an XR environment for an audience member in a hierarchical multiuser communication session in accordance with some embodiments.

FIG. 17 is an example of a view on display 26 for an audience member in the multiuser communication session. As shown in FIG. 17, the XR environment presented to the presenter may include a virtual stage 82. The virtual stage may include an avatar 96-P for the presenter, an application window 86 that is being presented by the presenter, etc.

The virtual stage may be presented to the audience member from a customizable viewpoint 106. As the audience member moves the position and orientation of their head, the viewpoint of the virtual stage is updated in real time to simulate a physical environment. Moreover, the audience member may change the baseline position of the customizable viewpoint 106 (e.g., the audience member may move their viewpoint from a front-right portion of the virtual audience to a back-left portion of the virtual audience). Changing the customizable viewpoint 106 may allow the audience member to simulate changing seats in the venue of the XR environment.

In some examples, the audience member may choose to change their customizable viewpoint 106 of the virtual stage. Instead or in addition, the presenter (e.g., an active presenter or an inactive presenter) may change the customizable viewpoint for one or more audience members. As one example, an active presenter may move to a first side of the stage to perform a demonstration with a first virtual object. At this time, the active presenter may change the customizable viewpoint 106 for the audience members to a viewpoint that is adjacent to the first side of the stage within the virtual audience. The active presenter may then move to a second side of the stage to perform a demonstration with a second virtual object. At this time, the active presenter may change the customizable viewpoint 106 for the audience members to a viewpoint that is adjacent to the second side of the stage within the virtual audience.

The XR environment presented to an audience member may include a representation of virtual audience 84 in addition to a representation of virtual stage 82. The virtual audience may include a customizable venue 88 (similar to as shown and described in connection with FIG. 16). The audience member may change the appearance of the customizable venue and/or the presenter may change the appearance of the customizable venue. In some multiuser communication sessions, the customizable venue may be fixed across all participants. In other words, the presenter selects a given venue that is then included in the representation of the XR environment for all of the participants. In some multiuser communication sessions, the customizable venue may be represented differently for different participants. Consider the example of a concert where a musician is performing for 100,000 audience members. The presenter (musician) may choose a stadium for their representation of the venue to represent the large size of the audience. An audience member, however, may wish to simulate a more intimate experience and may therefore select a small room as their representation of the venue in the XR environment The virtual audience in FIG. 17 may include one or more audience member avatars 96. As described in connection with FIG. 16, each avatar depicted in the virtual audience may or may not be associated with an individual audience member participating in the multiuser communication session. The avatars 96 represented to the user (and permitted communication levels with devices associated with those avatars) may be selected using user input, stored contact information on the electronic device, physical proximity information, proximity information from within the XR environment for the multiuser communication session, and/or using other desired information.

The virtual audience in FIG. 17 may further include generalized audio feedback 102 and audience member audio 104 (similar to as described in connection with FIG. 16).

Virtual audience 84 also includes generalized visual feedback 108 (e.g., a generalized audience attention indicator, a generalized audience mood indicator and/or a generalized audience attendance indicator as described in connection with FIG. 16).

Virtual audience 84 may include interactive virtual content 110. For example, a virtual object (e.g., a three-dimensional model of a product) may be presented in front of each audience member. The audience member may optionally be able to manipulate the virtual object (e.g., change the orientation or location of the virtual object using hand gestures or other user input).

The representation of the virtual audience presented to an audience member may be customizable (e.g., features may be added, removed, or changed based on user input).

In a physical environment, a given audience member may directly interact with other audience members in their proximity (e.g., the given audience member may speak to a neighboring audience member during the presentation) and not directly interact with other audience members (e.g., audience members that are not in close physical proximity to the given audience member, audience members that are unknown to the given audience member, etc.). However, even without directly interacting with the other audience members, the given audience member may still receive feedback from the other audience members in a physical environment (e.g., the given audience member may hear the murmur of crowd noise, may see when one or more other audience members stands up, etc.). The representation of the virtual audience presented to an audience member in an XR environment for a multiuser communication session may simulate this type of experience.

A given audience member may have a viewpoint that is positioned in close physical proximity to one or more other avatars 96 that are associated with one or more participants of the multiuser communication session having the audience member role. The given audience member may be able to directly communicate with the one or more participants represented by the one or more nearby avatars. During the multiuser communication session, the given audience member may turn their head to look at the neighboring avatars and may exchange audio communication with the one or more participants represented by the one or more nearby avatars (thus simulating being in a physical environment with other audience members).

The direct communication with the one or more participants represented by the one or more nearby avatars may also include presenting continuously updated facial expressions on the one or more nearby avatars (that reflect the real-time facial expression of the audience members controlling those avatars).

In other words, a given audience member may be allowed to communicate directly with a subset of the other audience members. The subset of the audience members with whom direct communication is permitted may be selected using user input (e.g., the given audience member may receive a prompt for direct communication and may authorize the prompt, the given audience member may select other audience members for direct communication from a list of other audience members, etc.), using stored contact information on the electronic device (e.g., the given audience member may have a list of contacts and direct communication may automatically be authorized for other audience members that are on the list of contacts), using physical proximity information (e.g., audience members that share the same physical environment such as the same room, the same house, the same city, etc. may be able to communicate directly), using proximity information from within the XR environment for the multiuser communication session (e.g., avatars in close proximity in the XR environment may be able to directly communicate) and/or using other desired information.

The remaining audience members that are not authorized for direct communication may be unable to directly communicate with the given audience member. The remaining audience members may be represented in the virtual audience using avatars. However, the given audience member may not receive audience member audio 104 from any of the remaining audience members and/or facial expressions may be omitted from any of the remaining audience member avatars. As another option, there may be other avatars in the virtual audience that are not individually controlled by one of the participants of the multiuser communication session having the audience member role (similar to as discussed in connection with FIG. 16).

The presentation of virtual audience 84 may include generalized audio feedback 102 for the remaining audience members that are not authorized for direct communication. Additionally, generalized visual feedback 108 may be presented that provides information (e.g., attention level information, mood information and/or attendance information) regarding the remaining audience members that are not authorized for direct communication.

Figure 18:
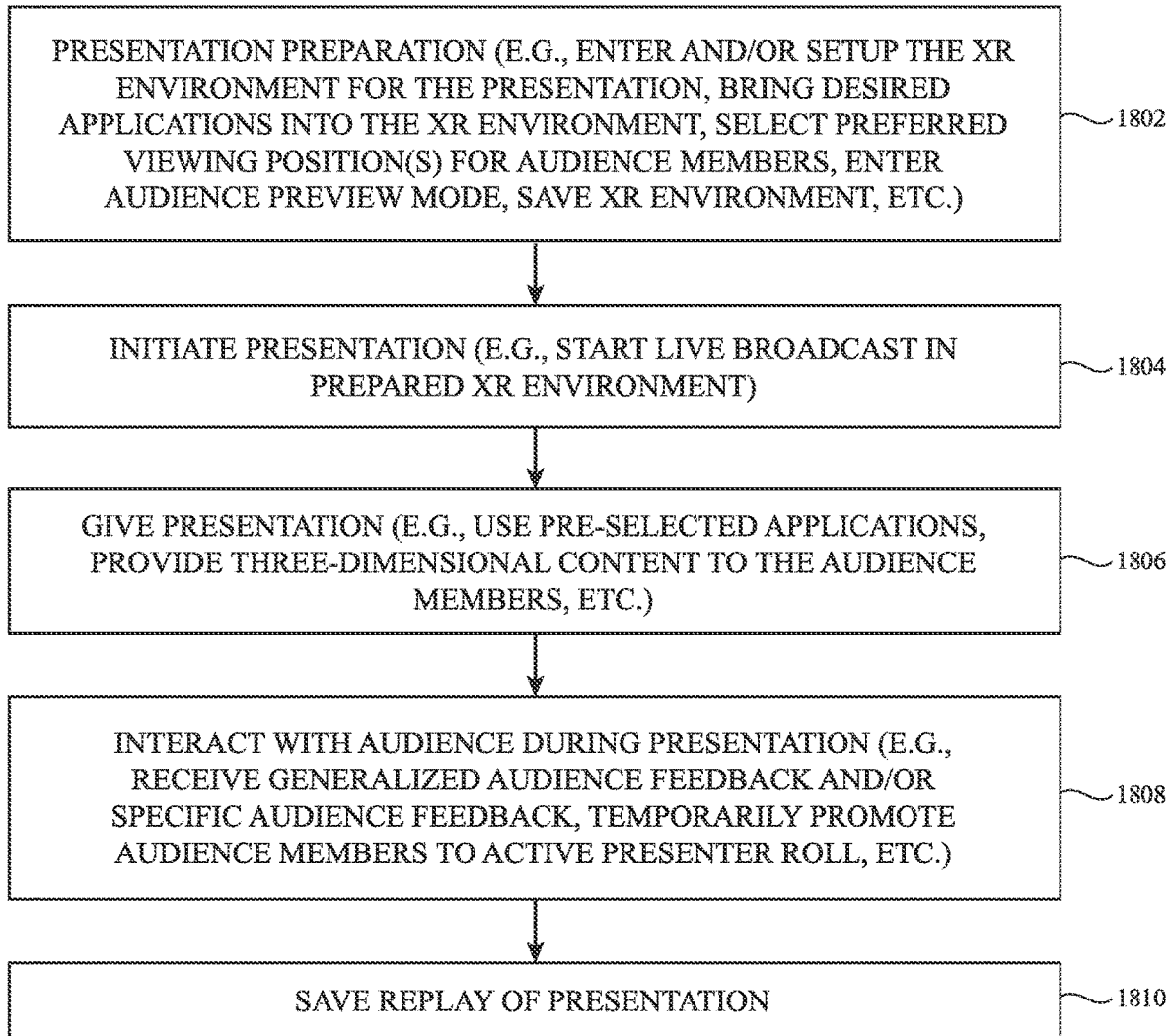
FIG. 18 is a flowchart showing an illustrative method of initiating and conducting a hierarchical multiuser communication session in accordance with some embodiments.

FIG. 18 is a flowchart showing an illustrative method performed by a head-mounted device (e.g., control circuitry 16 in device 10) to initiate and conduct a presentation. The blocks of FIG. 18 may be stored as instructions in memory of electronic device 10, with the instructions configured to be executed by one or more processors in the electronic device.

The operations of block 1802 include presentation preparation operations. A presenter may enter and/or set up the XR environment for the presentation (e.g., using a presentation application). As examples, the presenter may by select a customizable venue 88 for the presentation and may customize the representation of virtual audience 84. The presenter may populate the XR environment with avatars to practice the presentation. The presenter may bring desired applications into the XR environment. For example, the presenter may position an application window 86 on the virtual stage that is used to present a slideshow. The presenter may also select one or more preferred viewing positions for audience members. The presenter may enter an audience preview mode in which the presenter views the virtual stage from the perspective of an audience member (e.g., from one of the preferred viewing positions).

At any time during the preparation operations, the presenter may exit and save the XR environment in its current state. For example, the presenter may create an XR environment and select a customizable venue and representation for virtual audience 84. Then, the presenter saves the arrangement for the XR environment and exits the application. Later, the presenter may enter the application and view the XR environment in the most recently saved state. The presenter may make additional updates to the XR environment (e.g., populating the virtual stage with one more applications) before finalizing the XR environment for the presentation.

During the operations of block 1804, the user may initiate the presentation. Initiating the presentation may include starting a live broadcast in the prepared XR environment, as one example. After initiating the presentation, one or more audience members may join the presentation. When the audience members join the presentation, they may automatically be positioned to have a viewpoint at one of the preferred viewing positions or may select one of the preferred viewing positions from a list. The presenter may later change the viewing position of one or more audience members during the presentation.

During the operations of block 1806, the user may give the presentation in the XR environment. The user may use the pre-selected applications that were populated on the virtual stage at block 1802 during the presentation at block 1806. Additionally, during the presentation, the presenter may provide three-dimensional content to the audience members. As one example, the presenter may cause a virtual object (e.g., a three-dimensional model of a product) to be positioned in front of each audience member for a demonstration. The presenter may manipulate the appearance of the virtual object in front of each audience member (e.g., in a synchronized fashion) or each audience member may individually manipulate the virtual object. As another example, the presenter may cause three-dimensional content to extend into the virtual audience (e.g., a large, exploded, three-dimensional model of a product may extend throughout the virtual audience such that the virtual audience is immersed in the exploded version of the product).

During the operations of block 1808, the presenter may interact with the audience. Interactions during block 1808 may include receiving generalized audience feedback (e.g., generalized visual audience attention indicator 90, generalized visual audience mood indicator 92, generalized visual audience attendance indicator 94, generalized audio feedback 102, etc.) and/or specific audience feedback such as audience member audio 104, an audience member list 100 with per-audience-member attention levels and/or moods, etc.

During the operations of block 1808, the presenter may selectively promote participants from having the role of audience member to having the role of presenter. When a participant has the role of audience member, the presenter may be unable to directly communicate with the participant. When that participant is promoted to the role of presenter, the presenter may be able to directly communicate with the participant.

During the operations of block 1810, the replay of the presentation may be saved for subsequent viewing. For example, an audience member may view the replay of the presentation from one of the preferred viewing positions after the presentation is complete.

Figure 19:
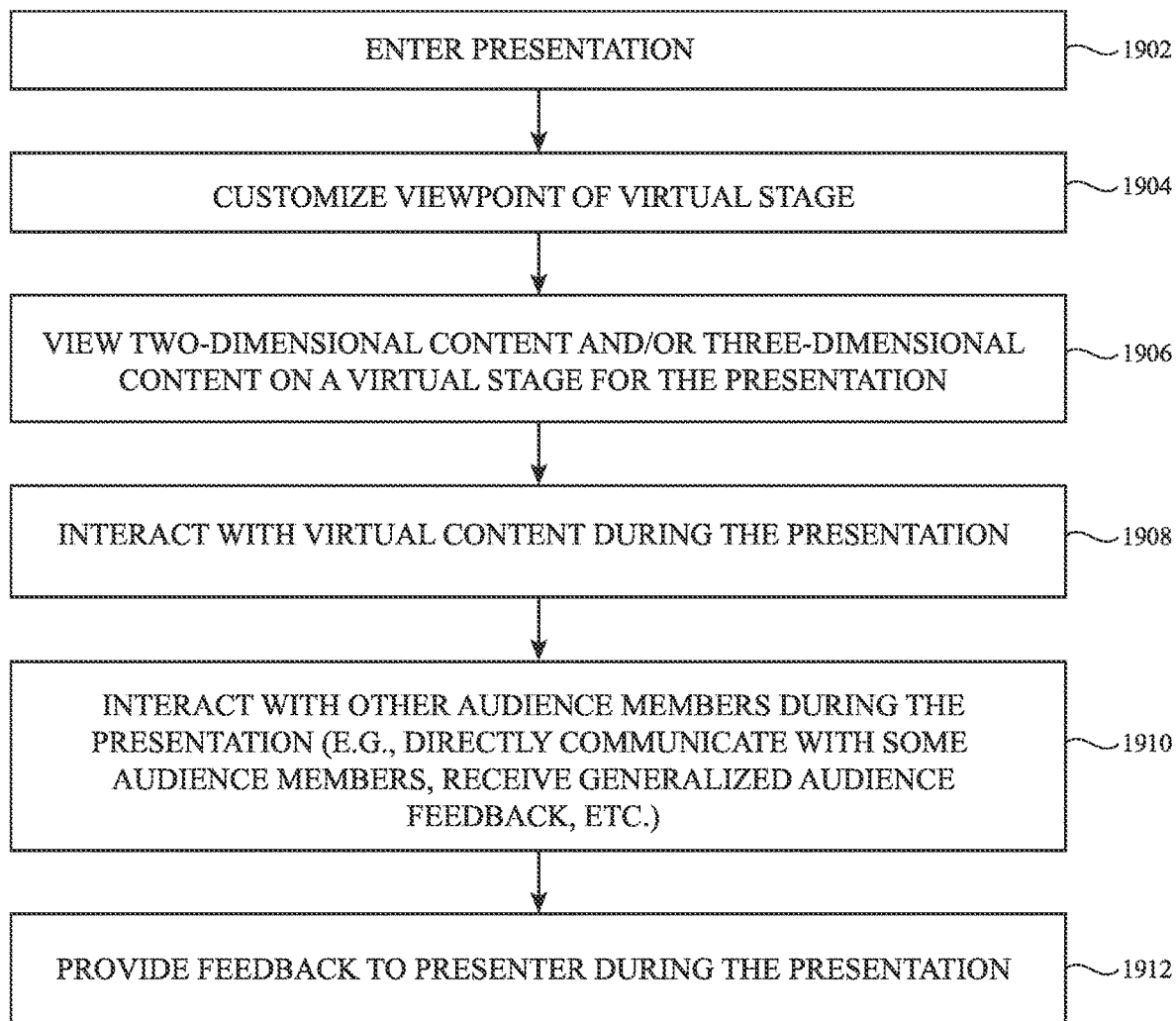
FIG. 19 is a flowchart showing an illustrative method of viewing a presentation as an audience member in a hierarchical multiuser communication session in accordance with some embodiments.

FIG. 19 is a flowchart showing an illustrative method performed by a head-mounted device (e.g., control circuitry 16 in device 10) to view a presentation as an audience member. The blocks of FIG. 19 may be stored as instructions in memory of electronic device 10, with the instructions configured to be executed by one or more processors in the electronic device.

In the operations of block 1902, the participant may enter the multiuser communication session (the presentation) with the role of audience member. The participant may join the presentation by clicking on a link in an application or on a web page, as some examples.

After joining the presentation, the audience member may select their customizable viewpoint 106 of the virtual stage 82 for the presentation in the operations of block 1904. The audience member may select one of a predetermined number of preferred viewpoints, may select any possible viewpoint within the customizable venue 88, etc.

During the operations of block 1906, the audience member may view two-dimensional content and/or three-dimensional content on the virtual stage for the presentation. The presentation may include, for example, presentation of a two-dimensional window 86 with a slideshow. The presentation may include a three-dimensional virtual object that is manipulated by the presenter during the presentation. The presenter's avatar may be a three-dimensional avatar that is presented to the audience member in block 1906. In general, any two-dimensional and/or three-dimensional content may be presented to the audience member on the virtual stage.

During the operations of block 1908, the audience member may interact with virtual content. As one example, the presenter may cause a virtual object (e.g., a three-dimensional model of a product) to be positioned in front of each audience member for a demonstration. Each audience member may individually manipulate the virtual object during the operations of block 1908. As another example, the presenter may cause three-dimensional content to extend into the virtual audience (e.g., the audience member may be immersed in an exploded, three-dimensional view of a virtual object).

During the operations of block 1910, the participant may interact with other audience members. The participant may directly communicate with some audience members (e.g., audience members that are in close proximity to the participant in the participant's physical environment, audience members that are in close proximity to the participant in the XR environment for the multiuser communication session, audience members that are known contacts to the participant, audience members that are selected using user input, etc.). The participant may receive generalized audience feedback from the remaining audience members. The participant may not be able to directly communicate with the remaining audience members.

During the operations of block 1912, the participant may provide feedback to the presenter to the presentation. The feedback provided at block 1912 may include reaction information (e.g., attention level, mood, etc.), unsolicited feedback (e.g., the audience member may select a heart icon or thumbs-down that is then displayed for the presenter), and/or solicited feedback (e.g., the audience member may answer a poll question asked by the presenter).

Figure 20:
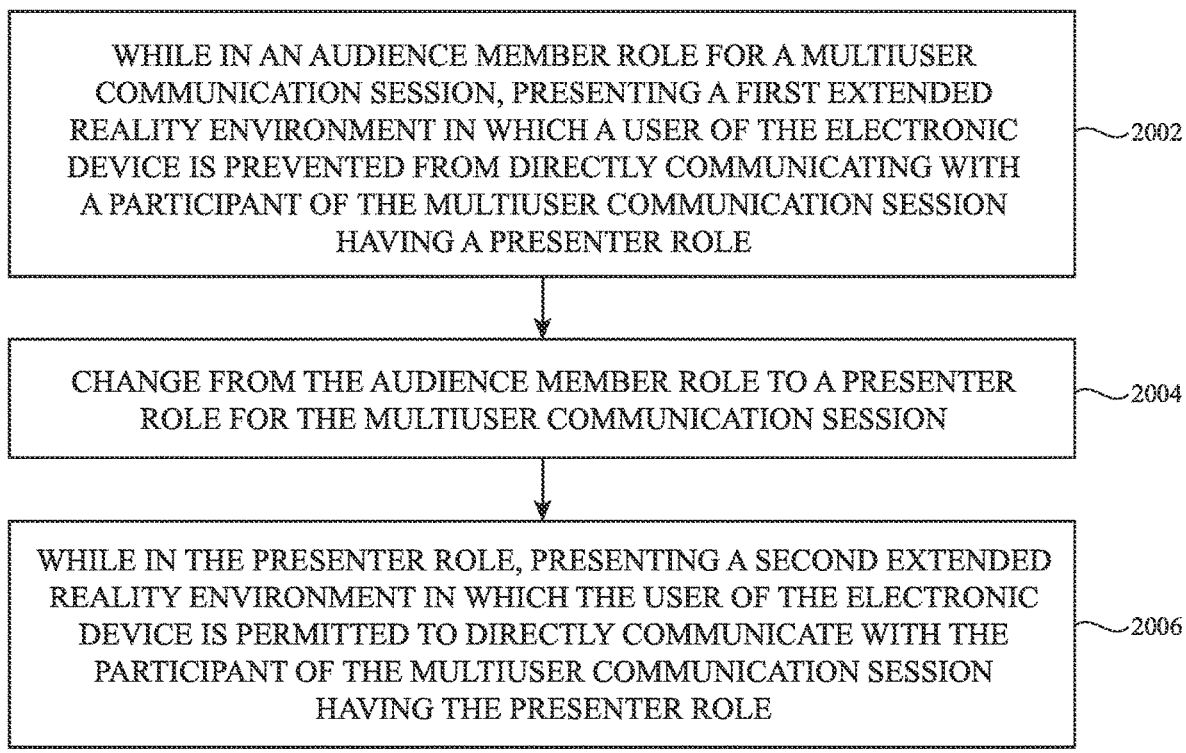
FIG. 20 is a flowchart showing an illustrative method of changing a participant's role in a hierarchical multiuser communication session in accordance with some embodiments.

FIG. 20 is a flowchart showing an illustrative method performed by a head-mounted device (e.g., control circuitry 16 in device 10) worn by a user in a hierarchical multiuser communication session. The blocks of FIG. 20 may be stored as instructions in memory of electronic device 10, with the instructions configured to be executed by one or more processors in the electronic device.

As shown in FIG. 20, during the operations of block 2002, while the user is in an audience member role for the multiuser communication session, the head-mounted device may present (e.g., using at least display 26) a first extended reality environment. The first extended reality environment may include a representation of a virtual stage from a perspective in a virtual audience. The virtual audience may be representative of participants of the multiuser communication session having the audience member role. While in the audience member role (e.g., audience member 72 in FIG. 14), the user (e.g., the user of the head-mounted device) may be prevented from directly communicating with a participant of the multiuser communication session having a presenter role (e.g., active presenter role 76 in FIG. 14 or inactive presenter role 74 in FIG. 14). During the operations block 2002, while the user cannot directly communicate with the participant having the presenter role, the user may directly communicate (e.g., using audio communications) with other participants having the audience member role.

During the operations of block 2004, the user may change from the audience member role to a presenter role for the hierarchical multiuser communication session. The change from the audience member role to the presenter role may be requested by a current presenter for the multiuser communication session and authorized by the user, may be requested by the user and authorized by a current presenter for the multiuser communication session, etc.

In response to the change from the audience member role to the presenter role for the multiuser communication session, the head-mounted device may present (e.g., at least using display 26) a second extended reality environment during the operations of block 2006. The second extended reality environment may include a representation of the virtual audience from a perspective on the virtual stage. During the operations of block 2006, the user of the electronic device may also be permitted to directly communicate with the participant of the multiuser communication session having the presenter role. During the operations of block 2006, the user may not be able to directly communicate with the other participants having the audience member role from block 2002.

Examples herein have described multiuser communication sessions where participants (e.g., audience members and/or presenters) are presented an XR environment in full virtual reality. In full virtual reality (sometimes referred to as virtual reality with full range of motion, a virtual reality viewing mode, etc.), the XR content fully occupies the display (e.g., the XR content is 'maximized' to take up all of the available display real estate). Additionally, the user may look around the XR environment for the multiuser communication session and perceive three-dimensional content for the entire virtual room. In other words, the XR environment is a three-dimensional environment and content representing the three-dimensional environment is presented based on a viewpoint positioned within the representation of the three-dimensional environment (e.g., an immersive viewpoint). The viewpoint is repositioned responsive to movements detected by the one or more sensors (e.g., position and motion sensors 32 in FIG. 1).

A virtual reality viewing mode of this type may be the most immersive viewing mode available to the user of electronic device 10. However, in some situations the user may wish to view the multiuser communication session in a viewing mode that is less immersive than the virtual reality viewing mode.

The virtual reality viewing mode may be a full-screen viewing mode (because the XR content is 'maximized' to take up all of the available display real estate). The user of the electronic device may optionally change the viewing mode of the XR content to other full-screen viewing modes that are less immersive than the virtual reality viewing mode.

The XR content may be presented in a three-dimensional (3D) video mode with parallax over a limited range of motion. In other words, the XR content is presented as a three-dimensional video that occupies the full screen of display 26. In this type of viewing mode, the XR content may be presented based on a viewpoint that is external to the representation of the three-dimensional environment (e.g., a non-immersive viewpoint). The XR content is responsive to movements detected by the one or more sensors (e.g., position and motion sensors 32 in FIG. 1) within a limited range of motion. As an example, the user may move their head slightly left and slightly right and the XR content is adjusted accordingly (within the limited range of motion). However, outside of the limited range, the viewpoint is not repositioned responsive to movements detected by the one or more sensors (e.g., position and motion sensors 32 in FIG. 1).

The XR content may be presented in a three-dimensional (3D) video mode with no parallax. In other words, the XR content is presented as a three-dimensional video that occupies the full screen of display 26. In this type of viewing mode, the XR content may be presented based on a viewpoint that is external to the representation of the three-dimensional environment (e.g., a non-immersive viewpoint). However, the XR content is not responsive to movements detected by the one or more sensors (e.g., position and motion sensors 32 in FIG. 1). As an example, the user may move their head left and right and the viewpoint positioned within the representation of the XR content is unchanged.

The XR content may be presented in a two-dimensional (2D) full-screen video mode. In other words, the XR content is presented as a two-dimensional video that occupies the full screen of display 26. In this type of viewing mode, the XR content may be presented based on a viewpoint that is external to the representation of the three-dimensional environment (e.g., a non-immersive viewpoint). The XR content is not responsive to movements detected by the one or more sensors (e.g., position and motion sensors 32 in FIG. 1). As an example, the user may move their head left and right and the viewpoint positioned within the representation of the XR content is unchanged.

Figure 21:
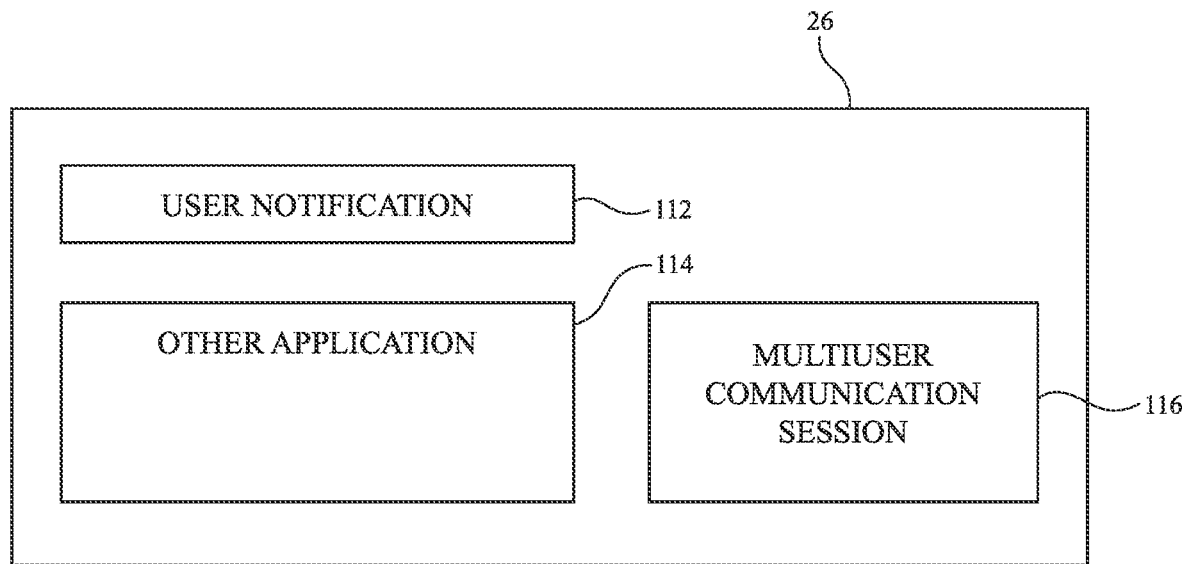
FIG. 21 is a view of an illustrative display operating in a viewing mode where a three-dimensional environment is represented as a two-dimensional video on a subset of a display in accordance with some embodiments.

The XR content may also be displayed in a non-full-screen viewing mode. In other words, the XR content does not fully occupy the display. In one non-full-screen viewing mode, shown in FIG. 21, the multiuser communication session is displayed as two-dimensional video in a window 116. Window 116 may be one of multiple windows simultaneously displayed on display 26. FIG. 21 shows other windows such as a user notification 112 and an application 114 that are displayed on display 26. In this way, the user may use other applications and/or view other information (at user notification window 112 and/or application window 114) while still having the XR content viewable via the two-dimensional video in window 116. Window 116 may sometimes be referred to as a picture-in-picture window. Picture-in-picture window 116 may be overlaid on other content on display 26 (e.g., in a corner of the display).

Figure 22:
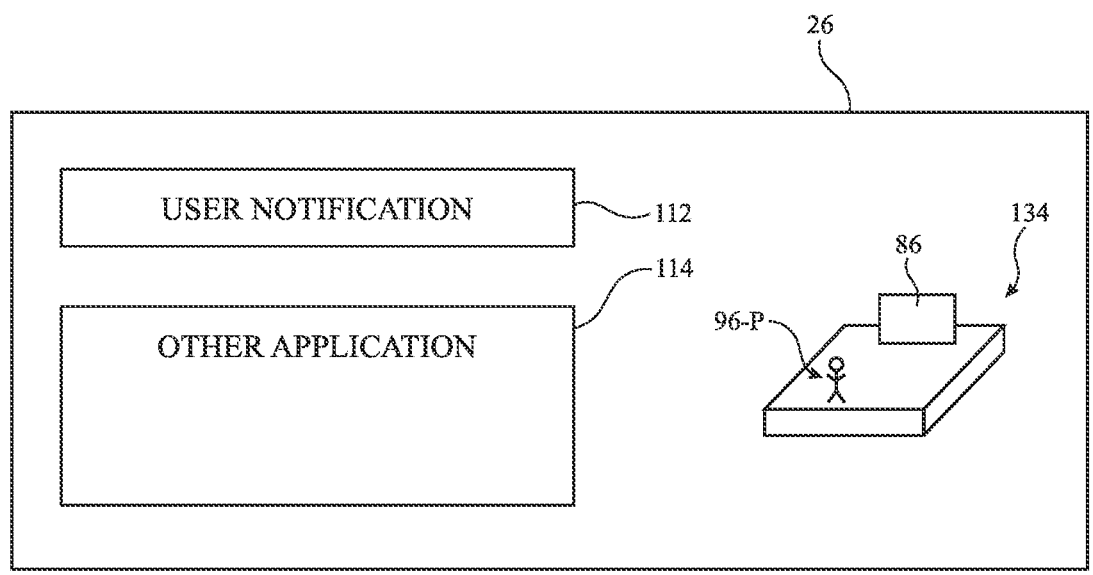
FIG. 22 is a view of an illustrative display operating in a viewing mode where a miniaturized version of a three-dimensional environment is presented on a subset of a display in accordance with some embodiments.

In another non-full-screen viewing mode, shown in FIG. 22, a miniaturized version of the XR content may be displayed on display 26. Miniaturized version 134 of the XR content may be a miniature three-dimensional version of the three-dimensional environment in the XR content. As shown in FIG. 22, the miniature version 134 may be depicted from a viewpoint that is sufficiently far from the virtual stage to show the entire virtual stage with the avatar 96-P and window 86. The miniature version 134 may also optionally include the entire virtual audience 84. Other attributes of the virtual stage and/or virtual audience (e.g., from FIG. 16 and/or FIG. 17) may be included in the miniature version 134. The miniature version 134 does not fully occupy the display and therefore may be displayed alongside user notification 112 and other application 114.

Figure 23:
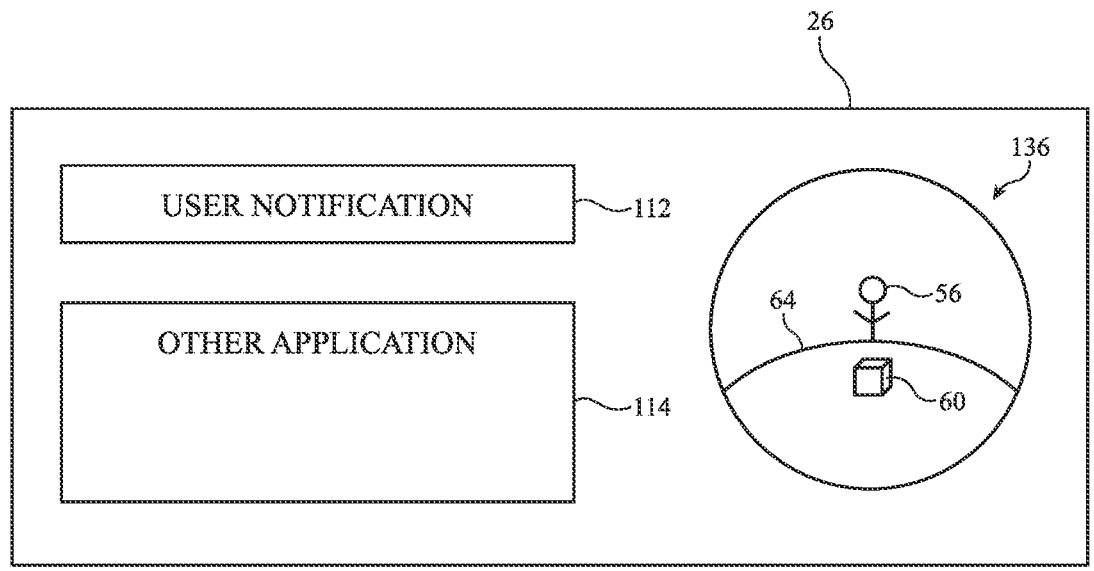
FIGS. 23 and 24 are views of an illustrative display operating in a viewing mode where a portal is presented on a subset of a display in accordance with some embodiments.
Figure 24:
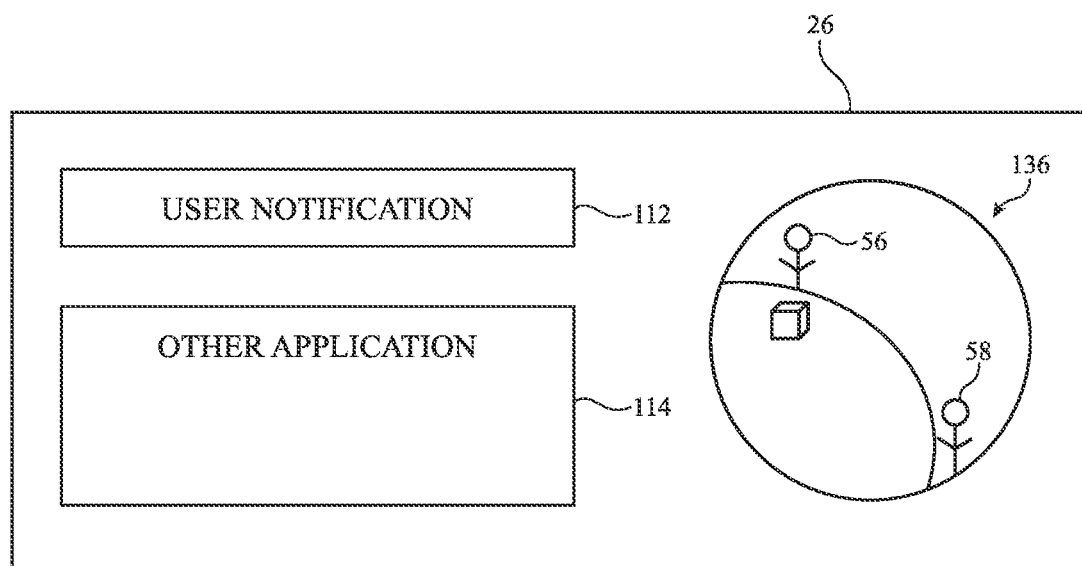

In another non-full-screen viewing mode, shown in FIGS. 23 and 24, a portal into the XR content may be displayed on display 26. This type of viewing mode may be referred to as a portal viewing mode or a virtual reality portal viewing mode. As shown in FIGS. 23 and 24, portal 136 may show a view (within the boundary of the portal) into the three-dimensional environment of the XR content. As shown in FIGS. 23 and 24, the XR content visible through the portal may change depending on the position and orientation of the user's head. In other words, the XR content in portal 136 is updated responsive to movements detected by the one or more sensors (e.g., position and motion sensors 32 in FIG. 1). FIG. 23 shows an example where the user is looking through the portal from directly in front of the portal. In this example, the user may see an avatar 56 and virtual object 60 on a virtual table 64 (similar to as shown in FIGS. 6A and 6B). In FIG. 24, the user may move their head and/or body to look through the portal from the left of the portal such that avatars 56 and 68 are both viewable through the portal. Portal 136 may be displayed at an apparent depth from the user. The portal may optionally be head-locked, body-locked, or world-locked.

Figure 25:
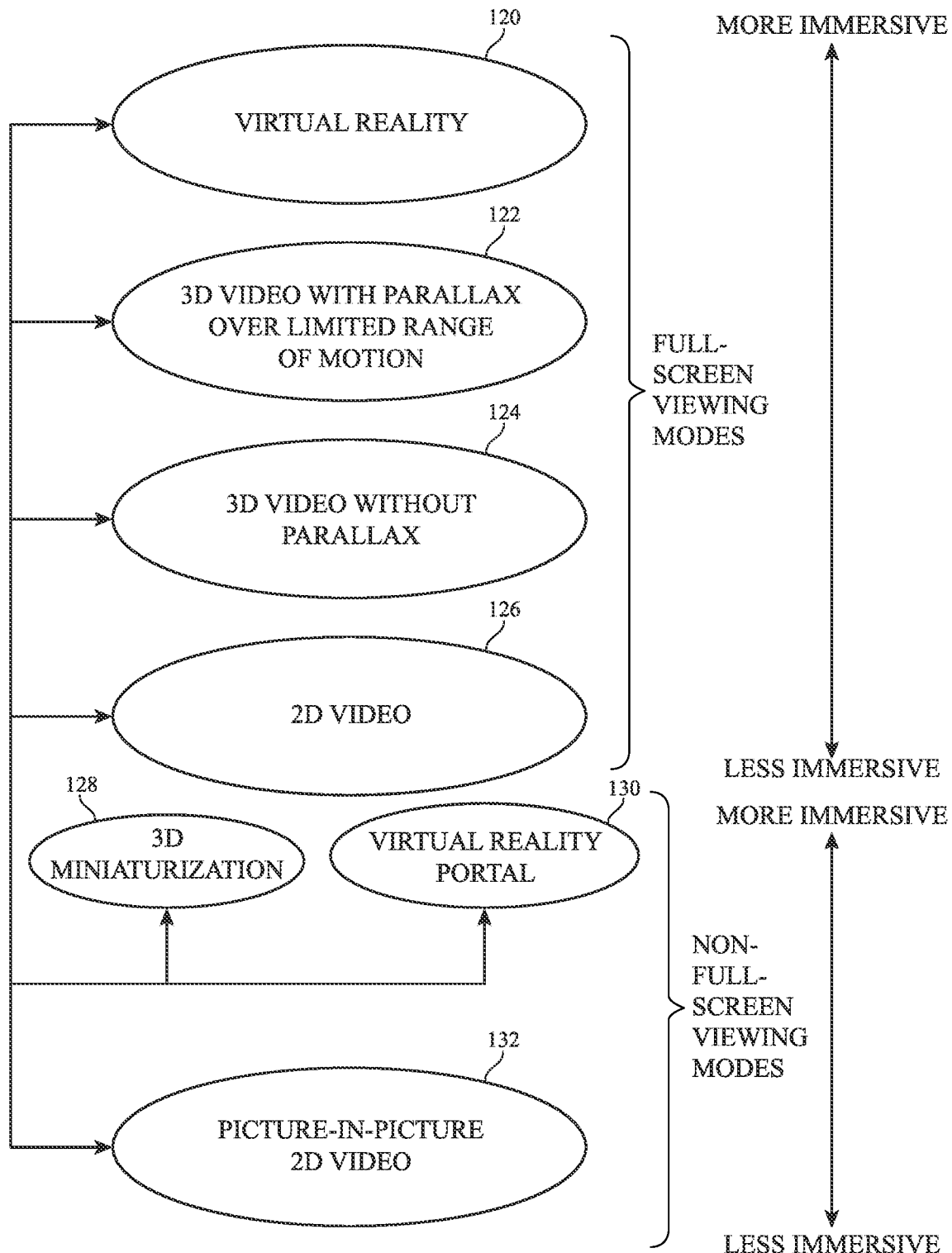
FIG. 25 is a state diagram showing illustrative viewing modes for content that includes a representation of a three-dimensional environment in accordance with some embodiments.

FIG. 25 is a state diagram showing different viewing modes for content that includes a representation (e.g., on a display) of a three-dimensional environment.

In virtual reality viewing mode 120, the content is presented in an extended reality environment based on a viewpoint positioned within the representation of the three-dimensional environment (e.g., the user is immersed in the three-dimensional environment such that they are surrounded by the three-dimensional environment across 360 degrees). In virtual reality viewing mode 120, the viewpoint is repositioned responsive to movements detected by one or more sensors (e.g., position and motion sensors 32). The movements may include rotational movements of the user's head.

In 3D video mode 122, the content is presented based on a viewpoint that is external to the representation of the three-dimensional environment (e.g., the user is not fully immersed in the three-dimensional content such that they are not surrounded by the three-dimensional environment across 360 degrees). In 3D video mode 122, the content is presented as three-dimensional video of the representation of the three-dimensional environment with parallax over a limited range. In 3D video mode 122, the viewpoint is repositioned responsive to movements detected by one or more sensors (e.g., position and motion sensors 32) within the limited range. The movements may include rotational movements of the user's head within the limited range.

In 3D video mode 124, the content is presented based on a viewpoint that is external to the representation of the three-dimensional environment (e.g., the user is not fully immersed in the three-dimensional content such that they are not surrounded by the three-dimensional environment across 360 degrees). In 3D video mode 124, the content is presented as three-dimensional video of the representation of the three-dimensional environment without parallax. In 3D video mode 124, the viewpoint is not repositioned responsive to movements detected by one or more sensors (e.g., position and motion sensors 32). In other words, rotations of the user's head do not change the representation of the three-dimensional environment in mode 124.

In 2D video mode 126, the content is presented based on a viewpoint that is external to the representation of the three-dimensional environment (e.g., the user is not fully immersed in the three-dimensional content such that they are not surrounded by the three-dimensional environment across 360 degrees). In 2D video mode 126, the content is presented as two-dimensional video of the representation of the three-dimensional environment. In 2D video mode 126, the viewpoint may not be repositioned responsive to movements detected by one or more sensors (e.g., position and motion sensors 32). In other words, rotations of the user's head do not change the representation of the three-dimensional environment in mode 126.

Modes 120, 122, 124, and 126 are full-screen viewing modes. In other words, in each one of modes 120, 122, 124, and 126, the content is presented across a full screen of the one or more displays 26. Virtual reality mode 120 may be considered more immersive than modes 122, 124, and 126. 3D video mode 122 (with limited parallax) may be considered more immersive than modes 124 and 126. 3D video mode 124 (without parallax) may be considered more immersive than mode 126.

The content may also be presented in one or more non-full-screen viewing modes. In a non-full-screen viewing mode, the content is presented on a subset of a full screen of the one or more displays 26. Non-full-screen viewing modes may include a 3D miniaturization viewing mode 128, a virtual reality portal viewing mode 130, and a picture-in-picture 2D video mode 132.

In 3D miniaturization viewing mode 128, the content is presented based on a viewpoint that is external to the representation of the three-dimensional environment (e.g., the user is not fully immersed in the three-dimensional content such that they are not surrounded by the three-dimensional environment across 360 degrees). In 3D miniaturization viewing mode 128, the content is presented as miniature version of the three-dimensional environment (as shown in FIG. 22). In 3D miniaturization viewing mode 128, the viewpoint is not repositioned responsive to movements detected by one or more sensors (e.g., position and motion sensors 32). In other words, rotations of the user's head do not change the representation of the three-dimensional environment in mode 128.

In virtual reality portal viewing mode 130, the content is presented based on a viewpoint that is external to the representation of the three-dimensional environment (e.g., the user is not fully immersed in the three-dimensional content such that they are not surrounded by the three-dimensional environment across 360 degrees). In virtual reality portal viewing mode 130, the content is presented as a portal into the three-dimensional environment (as shown in FIGS. 23 and 24). In virtual reality portal viewing mode 130, the viewpoint is repositioned responsive to movements detected by one or more sensors (e.g., position and motion sensors 32). The movements may include rotational movements of the user's head.

In picture-in-picture 2D video mode 132, the content is presented based on a viewpoint that is external to the representation of the three-dimensional environment (e.g., the user is not fully immersed in the three-dimensional content such that they are not surrounded by the three-dimensional environment across 360 degrees). In picture-in-picture 2D video mode 132, the content is presented as a two-dimensional video of the representation of the three-dimensional environment on only a subset of the display (as shown in FIG. 21). In picture-in-picture 2D video mode 132, the viewpoint is not repositioned responsive to movements detected by one or more sensors (e.g., position and motion sensors 32). In other words, rotations of the user's head do not change the representation of the three-dimensional environment in mode 132.

3D miniaturization mode 128 may be considered more immersive than picture-in-picture 2D video mode 132. Virtual reality portal viewing mode 130 may be considered more immersive than picture-in-picture 2D video mode 132.

It is noted that 3D video with parallax over limited range of motion (as in mode 122) and/or 3D video without parallax (as in mode 124) may be presented in a non-full-screen viewing mode if desired. For example the 3D video may be rendered onto a 2D window. References to video in connection with the above modes are merely illustrative. It should be understood that non-video two-dimensional and three-dimensional images may be displayed instead of video in each mode if desired.

In some cases, the representation of the three-dimensional environment may be presented in the most immersive full-screen viewing mode enabled by the hardware of the electronic device presenting the content. For example, a first electronic device (e.g., a head-mounted device) may have a stereoscopic display capable of displaying three-dimensional images whereas a second electronic device (e.g., a cellular telephone) may have a non-stereoscopic display that does not display three-dimensional images. The first electronic device is therefore operable in full-screen modes 120, 122, 124, and 126 whereas the second electronic device is operable in full-screen mode 126. The first electronic device may display the content in the virtual reality viewing mode 120 (e.g., the most immersive full-screen viewing mode available on the first electronic device). The second electronic device may display the content in the 2D video viewing mode 126 (e.g., the most immersive full-screen viewing mode available on the second electronic device).

The electronic device may default to the most immersive full-screen viewing mode available on the electronic device. However, a user may provide user input to change the viewing mode to a different, less immersive viewing mode. For example, a head-mounted device may default to presenting the content in virtual reality mode 120. The user of the head-mounted device may wish to reduce the immersion level of the presented content (e.g., to multitask, check a user notification, etc.). Accordingly, the user may provide user input to change the viewing mode from virtual reality mode 120 to a less immersive viewing mode (e.g., one of modes 122, 124, 126, 128, 130, and 132). The user may therefore customize the immersion level of the presented content to a level they prefer at a given point in time. The user may customize the position and size of the content when the content is presented in a non-full-screen mode (e.g., modes 128, 130, and 132).

As shown in FIG. 25, the electronic device may switch between any two of the viewing modes at any time.

Figure 26:
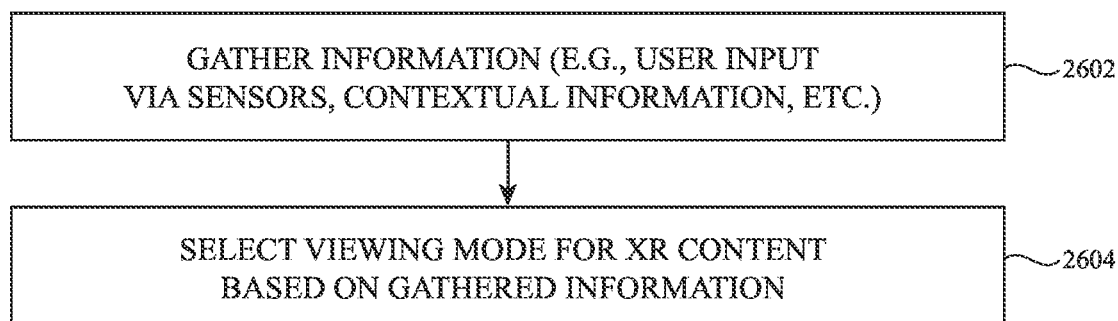
FIG. 26 is a flowchart showing an illustrative method for presenting a representation of a three-dimensional environment in different viewing modes in accordance with some embodiments.

FIG. 26 is a flowchart showing an illustrative method performed by a head-mounted device (e.g., control circuitry 16 in device 10) to present a representation of a three-dimensional environment in different viewing modes. The blocks of FIG. 26 may be stored as instructions in memory of electronic device 10, with the instructions configured to be executed by one or more processors in the electronic device.

During the operations of block 2602, the head-mounted device may gather information. The information may include user input that is gathered via sensors. For example, position and motion information from position and motion sensors 32, gaze-tracking information from gaze-tracker 28, and/or sensor information from other sensors 34 (e.g., touch input, button input, microphone input, etc.) may be used to obtain user input at block 2602. Additional information gathered at block 2602 may include contextual information. The contextual information may include information regarding the applications being used by the user, information regarding user notifications, etc.

During the operations of block 2604, the head-mounted device may select a viewing mode for extended reality content (e.g., a representation of a three-dimensional environment) based on the information gathered during block 2602. The head-mounted device may choose one of viewing modes 120, 122, 124, 126, 128, 130, and 132 from FIG. 25, as an example.

As an example, the extended reality content may be displayed in virtual reality mode 120 on a head-mounted device. During the operations of block 2602, the user may provide user input to switch from virtual reality mode 120 to 3D video mode 124. Accordingly, during the operations of block 2604, the viewing mode is changed to 3D video mode 124. Later, the user may provide additional user input to switch back to the virtual reality mode 120.

As an example, the extended reality content may be displayed in virtual reality mode 120 on a head-mounted device. During the operations of block 2602, the user may receive an email with a corresponding user notification. During the operations of block 2604, the head-mounted device may switch the viewing mode from virtual reality mode 120 to 3D miniaturization mode 128. The head-mounted device may display the user notification as well as the miniaturized version 134 (similar to as shown in FIG. 22). Subsequently, the user may provide additional user input to switch back to virtual reality mode 120.

Figure 27:
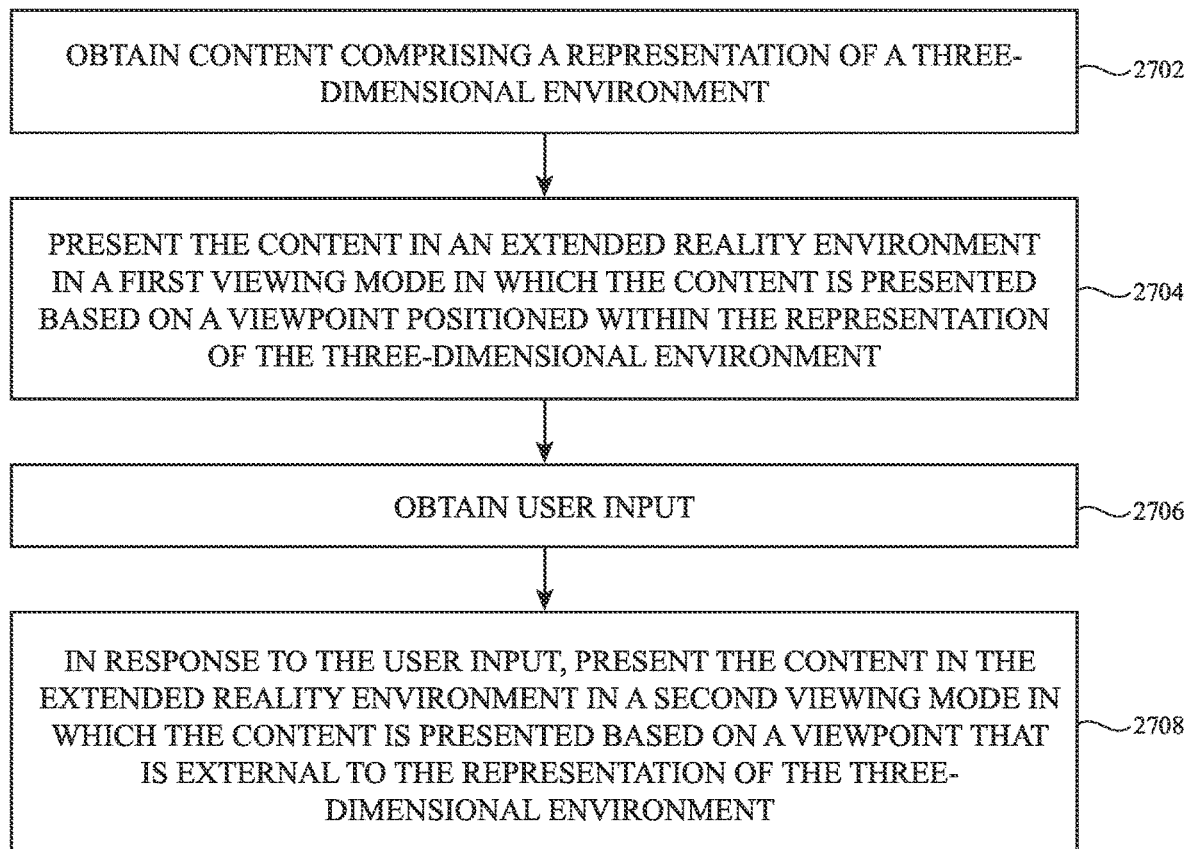
FIG. 27 is a flowchart showing an illustrative method for switching a viewing mode of a representation of a three-dimensional environment in accordance with some embodiments.

FIG. 27 is a flowchart showing an illustrative method performed by a head-mounted device (e.g., control circuitry 16 in device 10) to present a representation of a three-dimensional environment in a different viewing mode based on user input. The blocks of FIG. 27 may be stored as instructions in memory of electronic device 10, with the instructions configured to be executed by one or more processors in the electronic device.

During the operations of block 2702, the head-mounted device may obtain content that includes a representation of a three-dimensional environment. The content may be generated by multiuser communication session engine 50 on the head-mounted device and/or may be received from an external multiuser communication session engine.

During the operations of block 2704, the head-mounted device may present (using at least the one or more displays 26) the content from block 2702 in an extended reality environment in a first viewing mode. In the first viewing mode, the content is presented based on a viewpoint positioned within the representation of the three-dimensional environment. For example, the first viewing mode may be the virtual reality viewing mode 120 in FIG. 25.

In the first viewing mode (e.g., during the operations of block 2704), the viewpoint may be repositioned responsive to movements detected by one or more sensors (e.g., gaze-tracker 28, outward-facing camera 30, position and motion sensors 32, and/or other sensors 34 in FIG. 1). The movements may include rotational movements (e.g., rotations of the user's head that rotate the head-mounted device).

During the operations of block 2706, the head-mounted device may obtain user input using one or more sensors (e.g., gaze-tracker 28, outward-facing camera 30, position and motion sensors 32, and/or other sensors 34 in FIG. 1).

During the operations of block 2708, the head-mounted device may present (using at least the one or more displays 26) the content from block 2702 in the extended reality environment in a second viewing mode. In the second viewing mode, the content may be presented based on a viewpoint that is external to the representation of the three-dimensional environment. For example, the second viewing mode may be one of modes 122, 124, 126, 128, 130, and 132 in FIG. 25. Optionally, no three-dimensional version of the three-dimensional environment is presented in the second viewing mode.

The operations of block 2708 may further include presenting a view of a physical environment in which the electronic device (e.g., head-mounted device) is located from the viewpoint that is external to the representation of the three-dimensional environment.

The content obtained at block 2702 and presented at blocks 2704 and 2708 may be a live multiuser communication session (e.g., a non-hierarchical multiuser communication session or a hierarchical communication session) or a replay of a multiuser communication session (e.g., a non-hierarchical multiuser communication session or a hierarchical communication session).

As previously noted, extended reality content such as a multiuser communication session may be presented in a replay. Consider the example of a teacher giving a lesson to a group of students. The teacher may have the presenter role during a hierarchical multiuser communication session. During the live multiuser communication session, the teacher may receive generalized and/or individual feedback from the audience members (as discussed in connection with FIG. 16). After the live multiuser communication session is concluded, a replay of the multiuser communication session may be saved. Subsequently, another student may view the replay of the multiuser communication session from a position in the virtual audience.

Figure 28:
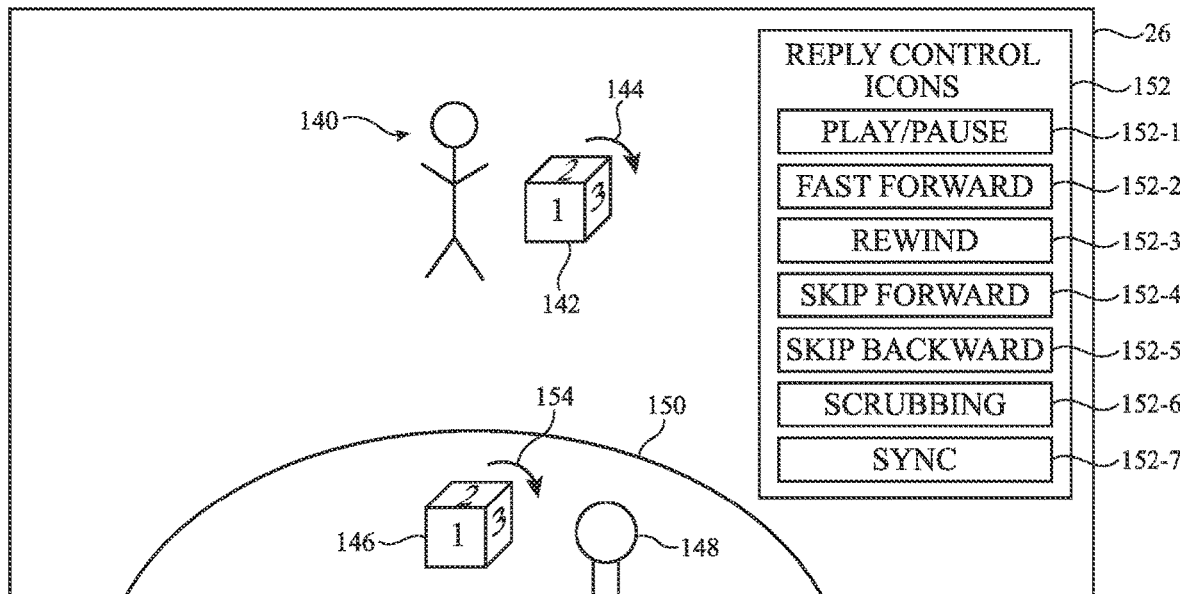
FIGS. 28 and 29 are views of an illustrative display showing a replay of an extended reality session in accordance with some embodiments.

FIG. 28 is a view of a replay of a multiuser communication session. As shown in FIG. 28, an avatar 140 (e.g., for the presenter) and a virtual object 142 are presented (e.g., on a virtual stage). Replay control icons 152 are also presented in the replay. The replay control icons include one or more icons for controlling playback of the replay. Examples of icons include a play/pause icon 152-1, a fast forward icon 152-2, a rewind icon 152-3, a skip forward icon 152-4, a skip backward icon 152-5, a scrubbing icon 152-6, and a sync icon 152-7.

The user of the electronic device (that is viewing the replay) may select the play/pause icon 152-1 to switch the replay between a play state and a paused state. The user of the electronic device may select the fast forward icon 152-2 to fast forward the replay. When fast forwarding, the replay may move forward in time (play) at a rate that is greater than a default rate (e.g., 2× speed, 4× speed, 8× speed, etc.). The user of the electronic device may select the rewind icon 152-3 to rewind the replay. When rewinding, the replay may move backward in time at a rate that is equal to default rate (e.g., 1x speed), a rate that is lower than the default rate (e.g., ½ speed), or a rate that is greater than the default rate (e.g., 2× speed, 4× speed, 8× speed, etc.). The user of the electronic device may select the skip forward icon 152-4 to skip the replay forward by a predetermined duration of time (5 seconds, 10 seconds, 15 seconds, 30 seconds, 60 seconds, between 3 and 60 seconds, etc.). The user of the electronic device may select the skip backward icon 152-5 to skip the replay backward by a predetermined duration of time (5 seconds, 10 seconds, 15 seconds, 30 seconds, 60 seconds, between 3 and 60 seconds, etc.). The scrubbing icon 152-6 may be a slider (e.g., representing a timeline of the replay) with a marker that is indicative of the current point of time within the replay. The user may drag the marker along the slider to view a different point of time within the replay. The user of the electronic device may select the sync icon 152-7 to synchronize an interactive portion of the replay with a stored state for the interactive portion of the replay.

In FIG. 28 the presenter is describing a virtual object 142 (in this case, a cube). The presenter may provide an instruction to rotate the cube in direction 144. The viewer of the replay has their own virtual object 146 that matches the virtual object 142 of the presenter. As shown in FIG. 28, the virtual object 146 may be present on a virtual table 150. The viewer may be able to manipulate virtual object 146 (e.g., to imitate the instructor) without virtual object 146 being impacted by the replay. In other words, virtual object 146 is displayed within the three-dimensional environment presented for the replay but does not have a pose that is fixed by the replay.

Figure 29:
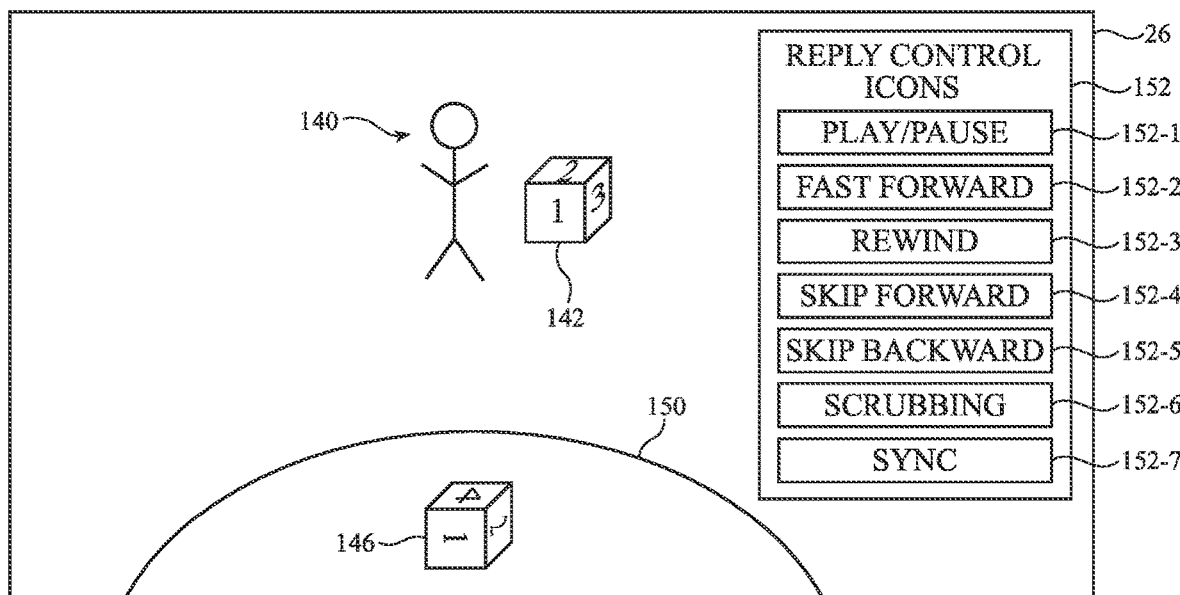

For example, avatar 140 may provide an instruction to rotate cube 142 in direction 144. After hearing the instruction, the viewer of the replay may pause the replay (e.g., by selecting icon 152-1). Pausing the replay may cause movement of avatar 140 and audio from avatar 140 to be paused. While the replay is paused, the viewer may provide user input to rotate virtual object 146 in direction 154 (e.g., to perform the instruction given by the presenter). The user input may be provided in the form of a hand gesture that causes virtual hand 148 to touch the virtual cube 146 or may be provided using types of user input. The result of this rotation is shown in FIG. 29. As shown in FIG. 29, virtual object 146 has been rotated while the replay is paused.

In some cases, interactive virtual object 146 may be manipulated using only user input. In other words, the interactive virtual object will remain static unless deliberately manipulated by the user (even as the replay is played, paused, fast forwarded, rewound, etc.).

In other cases, interactive virtual object 146 may optionally be manipulated based on the replay in addition to using user input. For example, the virtual object 146 may default to match the pose of the presenter's corresponding virtual object 142 while the replay is being played. The user may pause the replay and manipulate the virtual object using user input while the replay is paused. However, once the user resumes (plays) the replay the virtual object will change (instantly or gradually) to a pose that matches the pose of the presenter's corresponding virtual object (or another pose stored in the replay).

In another example, the virtual object 146 may match the pose of the presenter's corresponding virtual object 142 until user input is provided to manipulate the virtual object. Once user input is provided to manipulate the virtual object, the interactive virtual object will remain static unless deliberately manipulated by the user. However, the user may select the sync icon 152-7 at any time to synchronize the pose of interactive virtual object 146 to the pose of the presenter's corresponding virtual object 142 (or another pose stored in the replay).

Certain objects within the replay (e.g., avatar 140) may not be responsive to user input at any time during the replay. Certain objects within the replay (e.g., virtual object 142) may be responsive to user input during the replay only when the replay is paused. Certain objects within the replay (e.g., virtual object 146) may be responsive to user input during the replay when the replay is playing or when the replay is paused.

Figure 30:
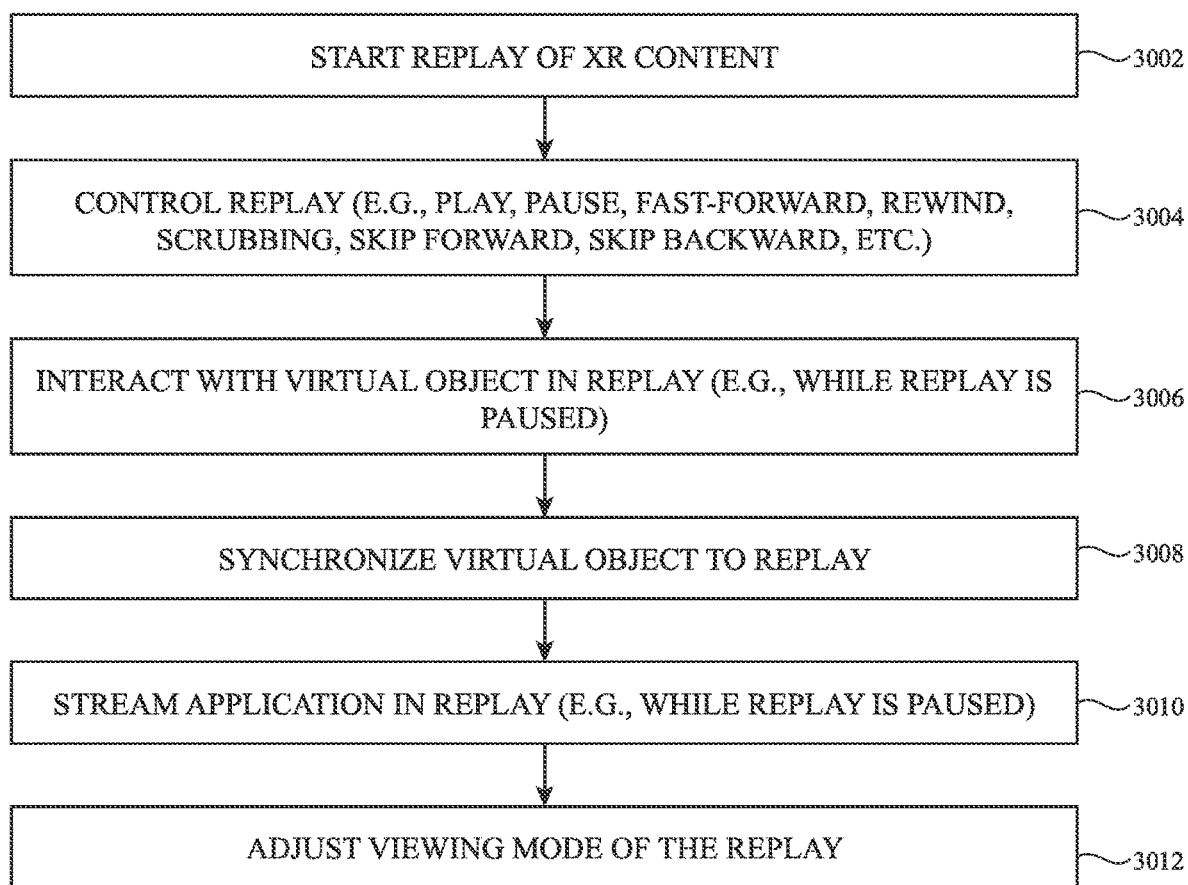
FIG. 30 is a flowchart showing an illustrative method for presenting a replay of XR content in accordance with some embodiments.

FIG. 30 is a flowchart showing an illustrative method performed by a head-mounted device (e.g., control circuitry 16 in device 10) to present a replay of XR content. The blocks of FIG. 30 may be stored as instructions in memory of electronic device 10, with the instructions configured to be executed by one or more processors in the electronic device.

During the operations of block 3002, the replay of XR content (e.g., a non-hierarchical multiuser communication session, a hierarchical communication session, etc.) is started. The replay of XR content may start in a given viewing mode (e.g., one of the modes in FIG. 25). The replay of XR content may include a representation of a three-dimensional environment.

During the operations of block 3004, the user may provide user input to electronic device 10 to control the replay. User input may be provided to cause the replay to play, pause, fast forward, rewind, skip forward, skip backward, scrub, etc. User input may be provided by selecting (e.g., using gaze input, touch input, audio input, etc.) a replay control icon 152. The replay control icons 152 may be continuously displayed over the three-dimensional environment presented in the replay or may only sometimes be displayed over the three-dimensional environment presented in the replay.

During the operations of block 3006, the user may interact with a virtual object in the replay. Some of the virtual objects in the replay may not be responsive to user input and only are manipulated using replay control icons 152 (e.g., by playing or pausing the replay). Other virtual objects in the replay are interactive virtual objects that are responsive to user input. In other words, the user may provide user input (e.g., hand gestures) that manipulate the pose of the virtual object. The interactive virtual object may be manipulated while the replay is paused, while the replay is playing, etc.

During the operations of block 3008, the user may optionally synchronize the interactive virtual object to the replay. The interactive virtual object may be synchronized to a default position associated with the replay that does not change throughout the replay, may be synchronized to match the pose of a corresponding virtual object in the replay (e.g., a virtual object being controlled by a presenter in a hierarchical multiuser communication session), or may be synchronized to match a pose from a pose timeline stored in the replay.

During the operations of block 3010, the user may stream an application in the replay. For example, the replay may include a virtual object (e.g., a virtual button, a window, etc.) with an associated application or link. The user may interact with the virtual object at any time during the replay (e.g., while the replay is paused, while the replay is playing, etc.). The user interactions may cause an application to be streamed within the replay.

As an example, a virtual button may be displayed with text that states: "select for tutorial video." The user may select the virtual button at any point during the replay. Selecting the virtual button may cause a video to be overlaid on the replay and/or an application window (e.g., for a word processor, a photo editor, a slideshow editor, etc.) to be overlaid on the replay.

During the operations of block 3012, the user may adjust the viewing mode of the replay. For example, the user may switch the current viewing mode (e.g., one of the viewing modes of FIG. 25) to any other viewing mode (e.g., any of the remaining viewing modes from FIG. 25). As an example, the user may change the viewing mode from a virtual reality viewing mode to a less immersive viewing mode in order to multitask while still viewing the replay.

Figure 31:
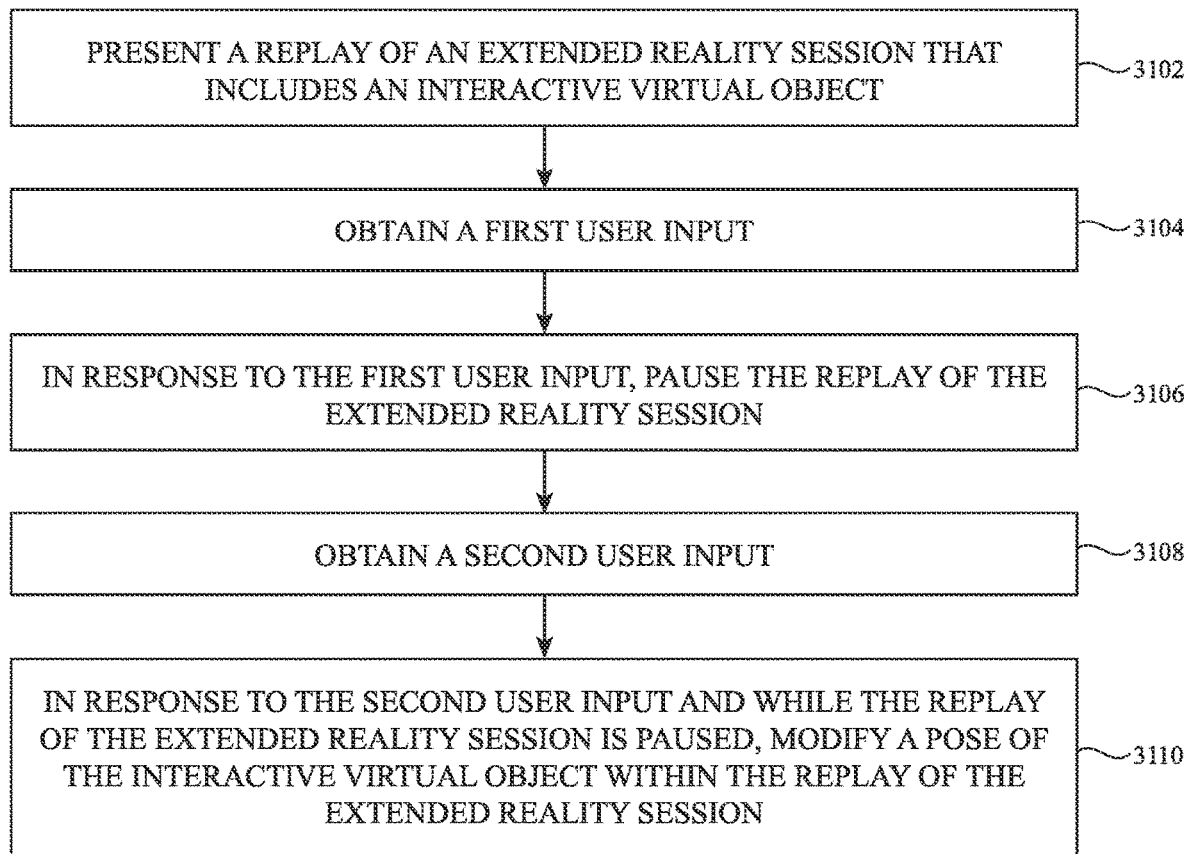
FIG. 31 is a flowchart showing an illustrative method for controlling a replay of XR content in accordance with some embodiments.

FIG. 31 is a flowchart showing an illustrative method performed by a head-mounted device (e.g., control circuitry 16 in device 10) to control a replay of XR content. The blocks of FIG. 31 may be stored as instructions in memory of electronic device 10, with the instructions configured to be executed by one or more processors in the electronic device.

During the operations of block 3102, the head-mounted device may present a replay of an extended reality session that includes an interactive virtual object. For example, the replay may be a replay of a hierarchical multiuser communication session and the interactive virtual object may be virtual object 146 in FIGS. 28 and 29.

During the operations of block 3104, the head-mounted device may obtain a first user input. The first user input may be obtained using one or more sensors (e.g., gaze-tracker 28, outward-facing camera 30, position and motion sensors 32, and/or other sensors 34 in FIG. 1).

During the operations of block 3106, the head-mounted device may pause the replay of the extended reality session in response to the first user input. The first user input may be, for example, a gaze input that targets play/pause icon 152-1 or an audio command to pause the replay.

During the operations of block 3108, the head-mounted device may obtain a second user input. The second user input may be obtained using one or more sensors (e.g., gaze-tracker 28, outward-facing camera 30, position and motion sensors 32, and/or other sensors 34 in FIG. 1).

During the operations of block 3110, the head-mounted device may, in response to the second user input and while the replay of the extended reality session is paused, modify a pose of the interactive virtual object within the replay of the extended reality session. The second user input may be, for example, a hand gesture. The hand gesture may cause a virtual hand to touch the interactive virtual object within replay of the extended reality session (as shown in FIG. 28).

The foregoing is merely illustrative and various modifications can be made to the described embodiments. The foregoing embodiments may be implemented individually or in any combination.

What is claimed is:

1. An electronic device comprising:
   one or more displays;
   one or more processors;
   one or more sensors; and
   memory storing instructions configured to be executed by the one or more processors, the instructions for:
      while in a presenter role for a multiuser communication session, presenting, using at least the one or more displays, an extended reality environment, wherein the extended reality environment comprises:
         a representation of a virtual audience from a perspective on a virtual stage, wherein the representation includes generalized feedback based on participants of the multiuser communication session having an audience member role;
      obtaining, using the one or more sensors, user input; and
      changing the representation of the virtual audience based on the user input, wherein changing the representation of the virtual audience comprises:
         adding a generalized visual audience attention indicator to the representation of the virtual audience;
         adding a generalized visual audience mood indicator to the representation of the virtual audience;
         adding a generalized visual audience attendance indicator to the representation of the virtual audience;
         adding poll results to the representation of the virtual audience;
         adding a list of at least some participants of the multiuser communication session having the audience member role to the representation of the virtual audience;
         adding avatars for at least some participants of the multiuser communication session having the audience member role to the representation of the virtual audience; or
         changing an appearance for a virtual venue in which the virtual audience appears.

2. The electronic device defined in claim 1, wherein the generalized feedback comprises:
   a generalized visual audience attention indicator based on an attention of the participants of the multiuser communication session having the audience member role;
   a generalized visual audience mood indicator based on a mood of the participants of the multiuser communication session having the audience member role; or
   a generalized visual audience attendance indicator based on a number of the participants of the multiuser communication session having the audience member role.

3. The electronic device defined in claim 1, wherein the representation of the virtual audience includes:
   a visual representation of an attention for an individual participant of the multiuser communication session having the audience member role; or
   a visual representation of a mood for an individual participant of the multiuser communication session having the audience member role.

4. The electronic device defined in claim 1, wherein the representation of the virtual audience comprises a plurality of avatars and wherein only a subset of the plurality of avatars is individually controlled by the participants of the multiuser communication session having the audience member role.

5. The electronic device defined in claim 1, further comprising:

one or more speakers, wherein the generalized feedback comprises generalized audio feedback that is presented by the one or more speakers and that is based on audio of the participants of the multiuser communication session having the audience member role.

6. The electronic device defined in claim 1, wherein the representation of the virtual audience comprises:
  poll results from the participants of the multiuser communication session having the audience member role;
  a list of at least some participants of the multiuser communication session having the audience member role; and
  avatars for at least some participants of the multiuser communication session having the audience member role.

7. The electronic device defined in claim 1,
  wherein the instructions further comprise instructions for:
    obtaining, using the one or more sensors, additional user input; and
    based on the additional user input, causing a change in a point of view of the virtual stage from within the extended reality environment for at least one participant of the multiuser communication session having the audience member role.

8. A method of operating an electronic device that comprises one or more displays and one or more sensors, the method comprising:
  while in a presenter role for a multiuser communication session, presenting, using at least the one or more displays, an extended reality environment, wherein the extended reality environment comprises:
    a representation of a virtual audience from a perspective on a virtual stage, wherein the representation includes generalized feedback based on participants of the multiuser communication session having an audience member role;
  obtaining, using the one or more sensors, user input; and
  changing the representation of the virtual audience based on the user input, wherein changing the representation of the virtual audience comprises:
    adding a generalized visual audience attention indicator to the representation of the virtual audience;
    adding a generalized visual audience mood indicator to the representation of the virtual audience;
    adding a generalized visual audience attendance indicator to the representation of the virtual audience;
    adding poll results to the representation of the virtual audience;
    adding a list of at least some participants of the multiuser communication session having the audience member role to the representation of the virtual audience;
    adding avatars for at least some participants of the multiuser communication session having the audience member role to the representation of the virtual audience; or
    changing an appearance for a virtual venue in which the virtual audience appears.

9. The method defined in claim 8, wherein the generalized feedback comprises:
  a generalized visual audience attention indicator based on an attention of the participants of the multiuser communication session having the audience member role;
  a generalized visual audience mood indicator based on a mood of the participants of the multiuser communication session having the audience member role; or
  a generalized visual audience attendance indicator based on a number of the participants of the multiuser communication session having the audience member role.

10. The method defined in claim 8, wherein the representation of the virtual audience includes:
  a visual representation of an attention for an individual participant of the multiuser communication session having the audience member role; or
  a visual representation of a mood for an individual participant of the multiuser communication session having the audience member role.

11. The method defined in claim 8, wherein the representation of the virtual audience comprises a plurality of avatars and wherein only a subset of the plurality of avatars is individually controlled by the participants of the multiuser communication session having the audience member role.

12. The method defined in claim 8, wherein the electronic device further comprises one or more speakers and wherein the generalized feedback comprises generalized audio feedback that is presented by the one or more speakers and that is based on audio of the participants of the multiuser communication session having the audience member role.

13. The method defined in claim 8, wherein the representation of the virtual audience comprises:
  poll results from the participants of the multiuser communication session having the audience member role;
  a list of at least some participants of the multiuser communication session having the audience member role; and
  avatars for at least some participants of the multiuser communication session having the audience member role.

14. The method defined in claim 8, further comprising:
  obtaining, using the one or more sensors, additional user input; and
  based on the additional user input, causing a change in a point of view of the virtual stage from within the extended reality environment for at least one participant of the multiuser communication session having the audience member role.

15. A non-transitory computer-readable storage medium storing one or more programs configured to be executed by one or more processors of an electronic device that comprises one or more displays and one or more sensors, the one or more programs including instructions for:
  while in a presenter role for a multiuser communication session, presenting, using at least the one or more displays, an extended reality environment, wherein the extended reality environment comprises:
    a representation of a virtual audience from a perspective on a virtual stage, wherein the representation includes generalized feedback based on participants of the multiuser communication session having an audience member role;
  obtaining, using the one or more sensors, user input; and
  changing the representation of the virtual audience based on the user input, wherein changing the representation of the virtual audience comprises:
    adding a generalized visual audience attention indicator to the representation of the virtual audience;
    adding a generalized visual audience mood indicator to the representation of the virtual audience;
    adding a generalized visual audience attendance indicator to the representation of the virtual audience;
    adding poll results to the representation of the virtual audience;

adding a list of at least some participants of the multiuser communication session having the audience member role to the representation of the virtual audience;

adding avatars for at least some participants of the multiuser communication session having the audience member role to the representation of the virtual audience; or changing an appearance for a virtual venue in which the virtual audience appears.

16. The non-transitory computer-readable storage medium defined in claim 15, wherein the generalized feedback comprises:

a generalized visual audience attention indicator based on an attention of the participants of the multiuser communication session having the audience member role;

a generalized visual audience mood indicator based on a mood of the participants of the multiuser communication session having the audience member role; or a generalized visual audience attendance indicator based on a number of the participants of the multiuser communication session having the audience member role.

17. The non-transitory computer-readable storage medium defined in claim 15, wherein the representation of the virtual audience includes:

a visual representation of an attention for an individual participant of the multiuser communication session having the audience member role; or a visual representation of a mood for an individual participant of the multiuser communication session having the audience member role.

18. The non-transitory computer-readable storage medium defined in claim 15, wherein the representation of the virtual audience comprises a plurality of avatars and wherein only a subset of the plurality of avatars is individually controlled by the participants of the multiuser communication session having the audience member role.

19. The non-transitory computer-readable storage medium defined in claim 15, wherein the electronic device further comprises one or more speakers and wherein the generalized feedback comprises generalized audio feedback that is presented by the one or more speakers and that is based on audio of the participants of the multiuser communication session having the audience member role.

20. The non-transitory computer-readable storage medium defined in claim 15, wherein the representation of the virtual audience comprises:

poll results from the participants of the multiuser communication session having the audience member role;

a list of at least some participants of the multiuser communication session having the audience member role; and avatars for at least some participants of the multiuser communication session having the audience member role.

21. The non-transitory computer-readable storage medium defined in claim 15, wherein the instructions further comprise instructions for:

obtaining, using the one or more sensors, additional user input; and based on the additional user input, causing a change in a point of view of the virtual stage from within the extended reality environment for at least one participant of the multiuser communication session having the audience member role.

\* \* \* \* \*